United States Patent
Nakai

(10) Patent No.: US 9,836,814 B2
(45) Date of Patent: Dec. 5, 2017

(54) DISPLAY CONTROL APPARATUS AND METHOD FOR STEPWISE DEFORMING OF PRESENTATION IMAGE RADIALLY BY INCREASING DISPLAY RATIO

(71) Applicant: Panasonic Intellectual Property Management Co., Ltd., Osaka (JP)

(72) Inventor: Wataru Nakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/977,309

(22) Filed: Dec. 21, 2015

(65) Prior Publication Data

US 2016/0203582 A1 Jul. 14, 2016

(30) Foreign Application Priority Data

Jan. 9, 2015 (JP) .................................. 2015-003463
Aug. 31, 2015 (JP) .................................. 2015-170773

(51) Int. Cl.
*G06T 3/20* (2006.01)
*G06T 11/60* (2006.01)
(Continued)

(52) U.S. Cl.
CPC ............ *G06T 3/20* (2013.01); *G02B 27/0179* (2013.01); *G06K 9/00791* (2013.01);
(Continued)

(58) Field of Classification Search
None
See application file for complete search history.

(56) References Cited

U.S. PATENT DOCUMENTS 7,954,951 B2 * 6/2011 Kuno ................. B60K 35/00
340/441
7,963,656 B2 * 6/2011 Kuno ................. B60K 35/00
340/441
(Continued)

FOREIGN PATENT DOCUMENTS

JP 2002-264692 9/2002
JP 2010-039793 2/2010

OTHER PUBLICATIONS

All Final Cut Pro X Transitions in under 8 minutes Uploaded by Yordi Capo Aug. 7, 2012. https://vimeo.com/47136813.*
(Continued)

*Primary Examiner* — Barry Drennan
*Assistant Examiner* — Jason Pringle-Parker
(74) *Attorney, Agent, or Firm* — Greenblum & Bernstein, P.L.C.

(57) ABSTRACT

A display control apparatus includes a receiver that receives a recognition result of a change in environment around a vehicle, and a controller that controls an image generation apparatus to generate an image corresponding to a presentation image to be displayed on the display medium. The controller generates and outputs a control signal to the image generation apparatus to control the image generation apparatus based on the recognition result so as to deform the presentation image radially on the display medium such that the deformed presentation image moves toward at least one of sides of the display medium and disappears sequentially to the outside of the display medium across edges of the display medium.

10 Claims, 25 Drawing Sheets

(51) Int. Cl.
  *G02B 27/01* (2006.01)
  *G06K 9/00* (2006.01)
  *G06T 3/00* (2006.01)
  *G09G 3/00* (2006.01)
  *G09G 5/00* (2006.01)
(52) U.S. Cl.
  CPC ............ *G06T 3/0093* (2013.01); *G06T 11/60* (2013.01); *G09G 3/001* (2013.01); *G09G 5/003* (2013.01); *B60R 2300/30* (2013.01); *G02B 2027/0183* (2013.01); *G09G 2340/10* (2013.01); *G09G 2340/12* (2013.01); *G09G 2380/10* (2013.01)

(56) References Cited

U.S. PATENT DOCUMENTS

| | | | | |
|---|---|---|---|---|
| 8,610,708 | B2* | 12/2013 | Richards | G06T 7/536 345/419 |
| 8,711,176 | B2* | 4/2014 | Douris | G01C 21/3602 345/158 |
| 9,210,321 | B2* | 12/2015 | Beaurepaire | H04N 5/23229 |
| 2011/0157474 | A1 | 6/2011 | Nagata | |
| 2011/0254861 | A1* | 10/2011 | Emura | G06F 3/0488 345/633 |
| 2012/0194554 | A1* | 8/2012 | Kaino | G08B 13/19621 345/633 |
| 2014/0112646 | A1 | 4/2014 | Ohta et al. | |
| 2014/0333729 | A1* | 11/2014 | Pflug | G06T 15/20 348/47 |
| 2015/0204687 | A1* | 7/2015 | Yoon | G01C 21/3658 701/436 |

OTHER PUBLICATIONS

The Extended European Search Report, dated May 10, 2016, for the related European Patent Application No. 15202772.8.

* cited by examiner

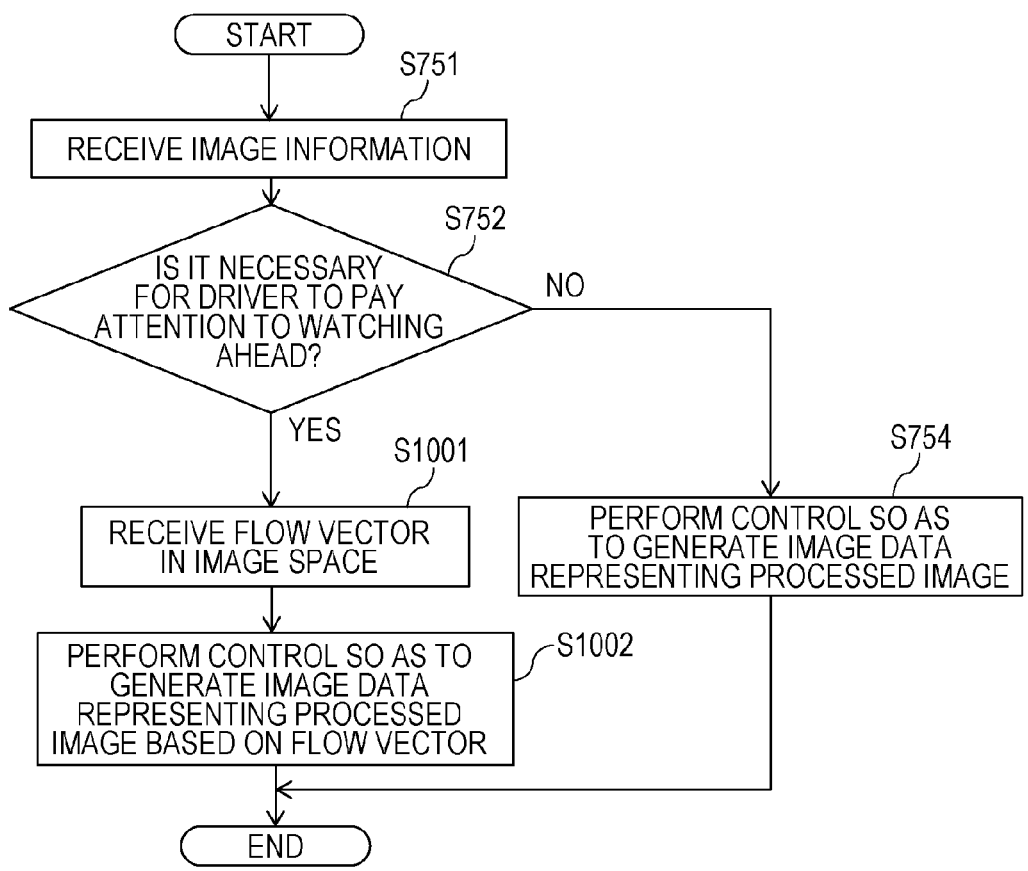

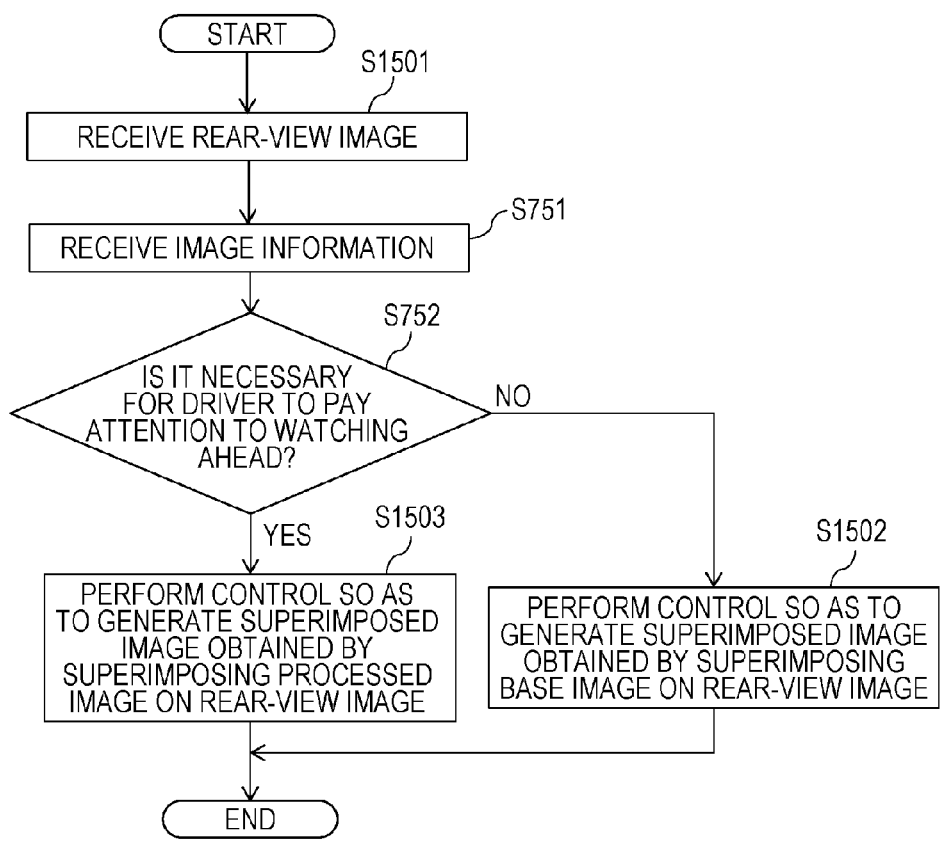

DISPLAY CONTROL APPARATUS AND METHOD FOR STEPWISE DEFORMING OF PRESENTATION IMAGE RADIALLY BY INCREASING DISPLAY RATIO

BACKGROUND

1. Technical Field

The present disclosure relates to a display control apparatus, a projection apparatus, a display control method, and a non-transitory computer readable storage medium.

2. Description of the Related Art

In recent years, it has been common to display a various kinds of information on a display installed in a vehicle. This may cause a driver to watch the display over a long time when a vehicle is running. Such long-time watching may cause a delay to occur before the driver pays attention back to watching ahead of the vehicle or may cause the driver not to gaze ahead of the vehicle. For example, Japanese Unexamined Patent Application Publication No. 2002-264692 discloses an in-vehicle display apparatus that allows a reduction in such a probability.

In the in-vehicle display apparatus disclosed in Japanese Unexamined Patent Application Publication No. 2002-264692, when the distance between a vehicle and another vehicle running ahead or the distance between the vehicle and an obstacle becomes small, a content displayed on the display is deleted, and the display is put into an instrument panel such that a display surface of the display is hidden. This makes the driver gaze ahead of the vehicle.

SUMMARY

However, in the in-vehicle display apparatus disclosed in Japanese Unexamined Patent Application Publication No. 2002-264692, sudden deleting of the content displayed on the display may bother a driver who is watching a scene ahead of a vehicle.

One non-limiting and exemplary embodiment provides a display control apparatus, a projection apparatus, a display control method, and a non-transitory computer readable storage medium, in which a content displayed on a display installed in a vehicle is controlled so as not to have an occurrence of a change in the content in a manner that may bother a driver, and more specifically, for example, sudden deleting of the content displayed on the display is prevented thereby contributing to enhancement of safety in driving.

In one general aspect, the techniques disclosed here feature that a display control apparatus includes a receiver that receives a recognition of a change in environment around a vehicle, and a controller that generates a control signal and outputs the control signal to an image generation apparatus, so as to deform a presentation image radially on a display medium such that the presentation image moves toward at least one of sides of the display medium and disappears sequentially to the outside of the display medium across an edge of the display medium, based on the received recognition result, the image generation apparatus generating image data corresponding to a presentation image to be displayed on the display medium based on the control signal.

The present disclosure makes it possible to control displaying an image so as not to have an abrupt change such as sudden disappearance, which contributes to enhancement of safety in driving.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 15 is a flow chart illustrating an example of an operation flow associated with a display control apparatus according to the second embodiment of the present disclosure;

FIG. 20 is a flow chart illustrating an example of an operation flow associated with a display control apparatus according to the fourth embodiment of the present disclosure;

DETAILED DESCRIPTION

Embodiments of the present disclosure are described in detail below with reference to drawings. Note that in the embodiments, elements having similar functions are denoted by similar reference symbols, and a duplicated description thereof is omitted.

First Embodiment

Figure 1:
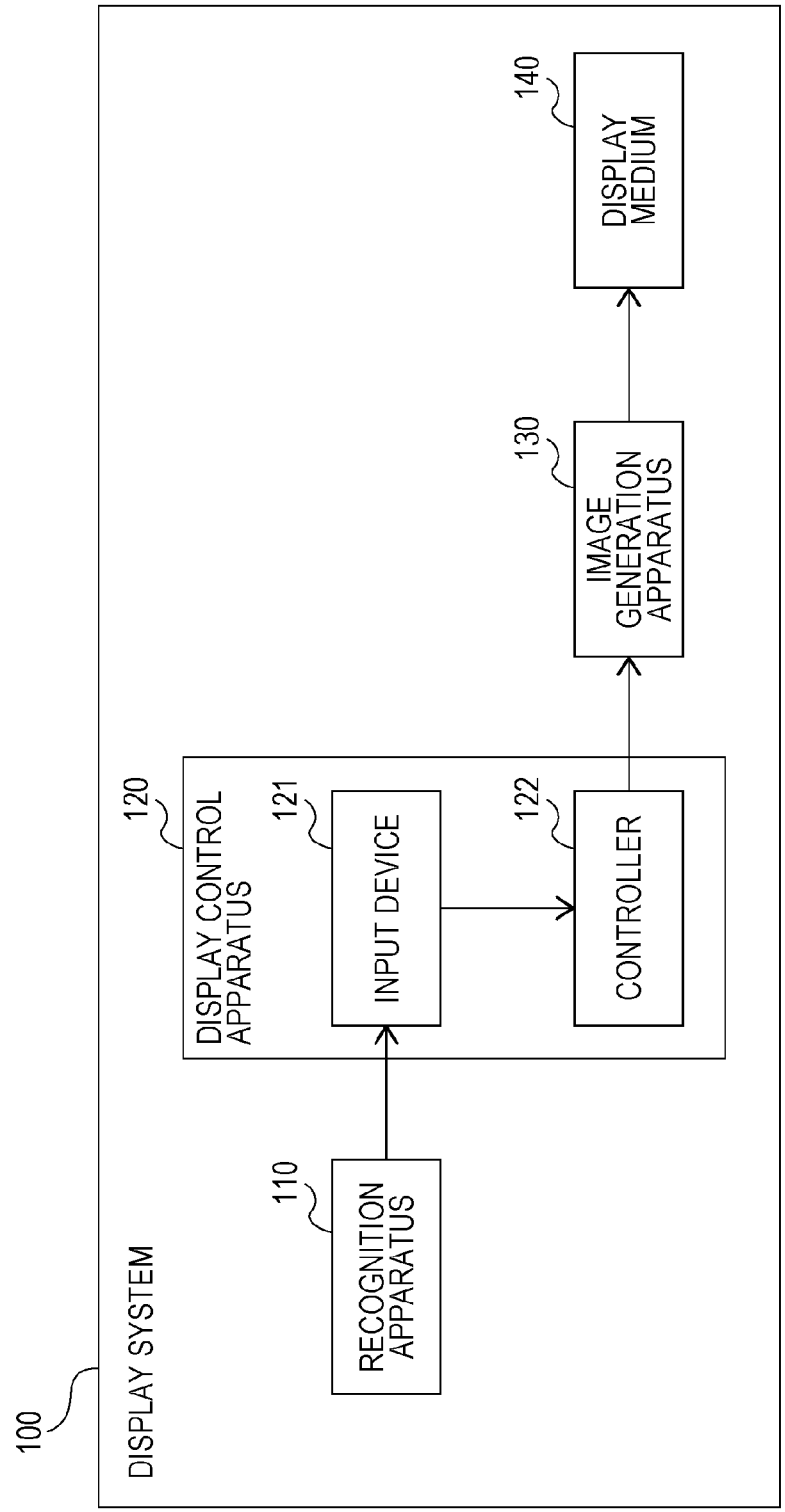
FIG. 1 is a block diagram illustrating an example of a configuration of a display system including a display control apparatus according to a first embodiment of the present disclosure.

FIG. 1 is a block diagram illustrating an example of a configuration of a display system 100 including a display control apparatus 120 according to a first embodiment of the present disclosure.

As illustrated in FIG. 1, the display system 100 includes a recognition apparatus 110, the display control apparatus 120, an image generation apparatus 130, and a display medium 140. The display control apparatus 120 includes an input device (a receiver) 121 and a controller 122.

The display system 100 includes a not-shown detection apparatus. The detection apparatus may be, for example, a sensing camera or a radar installed in the inside or the outside of a vehicle. In a case where the detection apparatus is a sensing camera, the sensing camera takes an image of a view seen ahead (a view seen ahead of the vehicle). In a case where the detection apparatus is a radar, the radar senses an environment around the vehicle. The detection apparatus outputs information associated with the look-ahead view image or the information associated with a sensing result to the recognition apparatus 110.

The recognition apparatus 110 recognizes a change in the environment around the vehicle, in which the display system 100 is installed, periodically at predetermined time intervals. More specifically, based on the information output from the detection apparatus, the recognition apparatus 110 recognizes an object appearing around the vehicle (for example, ahead of the vehicle). Examples of objects include a moving object (a vehicle, a person, a bicycle, a motorcycle, etc.), a road structure (a white line on a road, a road sign, a road marking, a curb, a guardrail, a traffic signal, an utility pole, a building, etc.), and the like. In a case where the detection apparatus is a sensing camera, the recognition apparatus 110 extracts a feature value included in the information on the look-ahead view image received from the detection apparatus, and recognizes the object based on the extracted feature value. In the case where the detection apparatus is a radar, the recognition apparatus 110 extracts and recognizes an object using a recognition method based on clustering or the like.

When the recognition apparatus 110 recognizes an object, the recognition apparatus 110 calculates a location of the object in a real space (hereinafter referred to as a "object location") and outputs information representing the object location (hereinafter referred to as "object location information") to the input device 121. A process of recognizing an object and a process of calculating an object location are known, and thus a description thereof is omitted.

The input device (the receiver) 121 receives the object location information from the recognition apparatus 110 and outputs the received object location information to the controller 122.

The input device 121 is also capable of receiving image information from a predetermined particular apparatus (not illustrated) and outputting the received image information to the controller 122. The image information is information used by image generation apparatus 130 in generating image data. The predetermined particular apparatus is an apparatus (a peripheral device) used in the vehicle other than the detection apparatus. Examples include a car navigation apparatus, an audio apparatus, a rear camera, a side camera, a front camera, an ETC in-vehicle device, various kinds of ECUs (Engine Control Units or Electronic Control Units), etc.

Based on the object location information received from the input device 121, the controller 122 determines whether it is necessary for a driver to gaze ahead of a vehicle. The determination as to whether it is necessary for the driver to gaze ahead of the vehicle may be performed, for example, based on whether there is a risk that the vehicle will collide with an object such as another vehicle or a pedestrian located ahead. Details of this determination process will be described later.

Furthermore, the controller 122 controls the image generation apparatus 130 so as to generate image data based on the image information received from the input device 121. More specifically, the controller 122 outputs a control signal to the image generation apparatus 130 thereby controlling the generation of the image data. Details of this control process will be described later. The image data is data that is to represent a presentation image when being displayed on the display medium 140. The presentation image is an image viewed by a vehicle occupant. In the present embodiment, the presentation image is classified into two types: an original undeformed presentation image (hereinafter, also referred to as a "base image"); and a deformed presentation image (hereinafter, also referred to as a "processed image"). Details thereof will be described later.

The image generation apparatus 130 generates image data based on a result of a calculation performed by the controller 122 (more specifically, a result of a calculation associated with the image deformation process (which will be described in detail later)) and image information received from the controller 122, and the image generation apparatus 130 outputs the generated image data to the display medium 140. For example, in a case in which the display medium 140 is a head-up display (HUD), the controller 122 projects the generated image data onto the display medium 140 using a projector function. This allows a vehicle occupant to view the image data as a virtual image.

Figure 2:
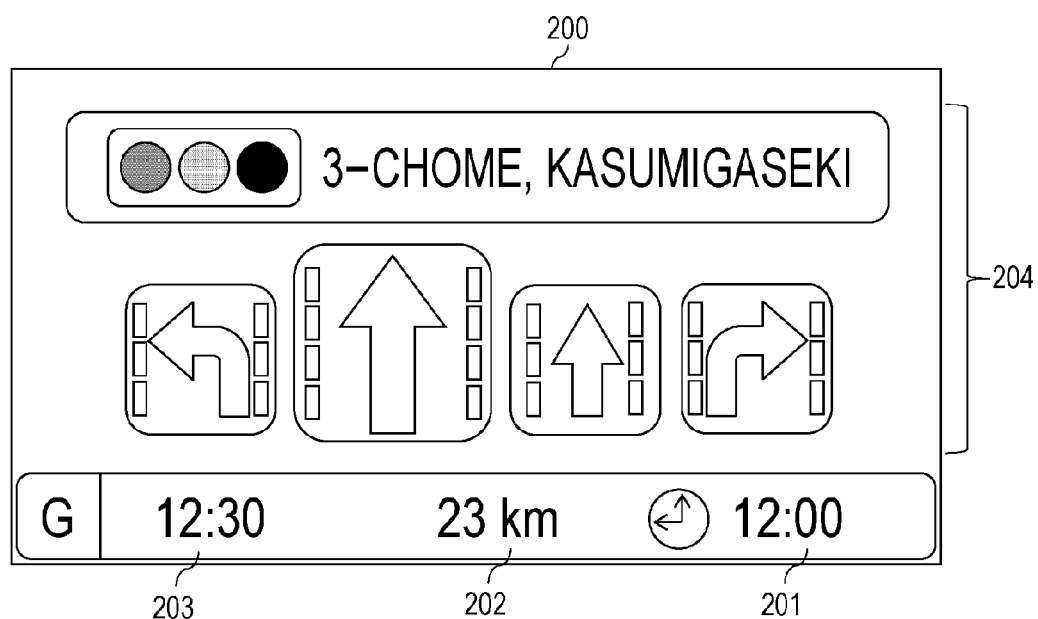
FIG. 2 is a diagram illustrating an example of a base image according to the first embodiment of the present disclosure.

FIG. 2 illustrates an example of a base image (that is, an original undeformed presentation image) viewed by a vehicle occupant. As shown in FIG. 2, the base image 200 includes images indicating a time 201, a distance 202 to a destination, an estimated arrival time to the destination 203, intersection information 204, and the like (hereinafter also referred to as element images). The element images are images that are constituent elements of the base image 200. Note that the element images 201 to 204 shown in FIG. 2 are original undeformed element images. Although not shown in FIG. 2, the base image 200 may further include element images indicating a vehicle speed, a sensing result in terms of an environment around a vehicle, an alarm associated with a vehicle (in terms of a half-open door, abnormally high water temperature, etc.) a fuel gauge, an entertainment information (in terms of video, music, etc.), and/or the like.

The display medium 140 is a medium that is used in a vehicle to display the image data generated by the image generation apparatus 130.

Examples usable as the display medium 140 include a head-up display (HUD), an electronic room mirror display, an electronic side mirror display, a meter display, a center display, a head-mounted display or a helmet-mounted display (HMD), an eyeglass-type display (smart glasses), a dedicated display, etc. Note that in the present embodiment, it is assumed by way of example that the display medium 140 is disposed at a location lower in height than an eyepoint of a driver.

The HUD may be, for example, a windshield of a vehicle or a glass plate or a plastic plate (for example, a combiner) disposed separately. The windshield, may be, for example, a front windshield, vehicle side glass or rear glass. In any case, the image data is displayed on the display medium 140.

The HUD may be a transparent display installed on the surface of the windshield or installed in a vehicle room. The transparent display is a display that allows a user to view both an object located behind the display and an image displayed on the display. In the present embodiment, the display medium 140 is assumed, by way of example, a light-transparent display medium.

In the present embodiment, the display control apparatus 120 and the image generation apparatus 130 may be combined together such that the image generation apparatus 130 is included in the display control apparatus 120 so as to realize a projection apparatus. The projection apparatus may further include the display medium 140.

Figure 3:
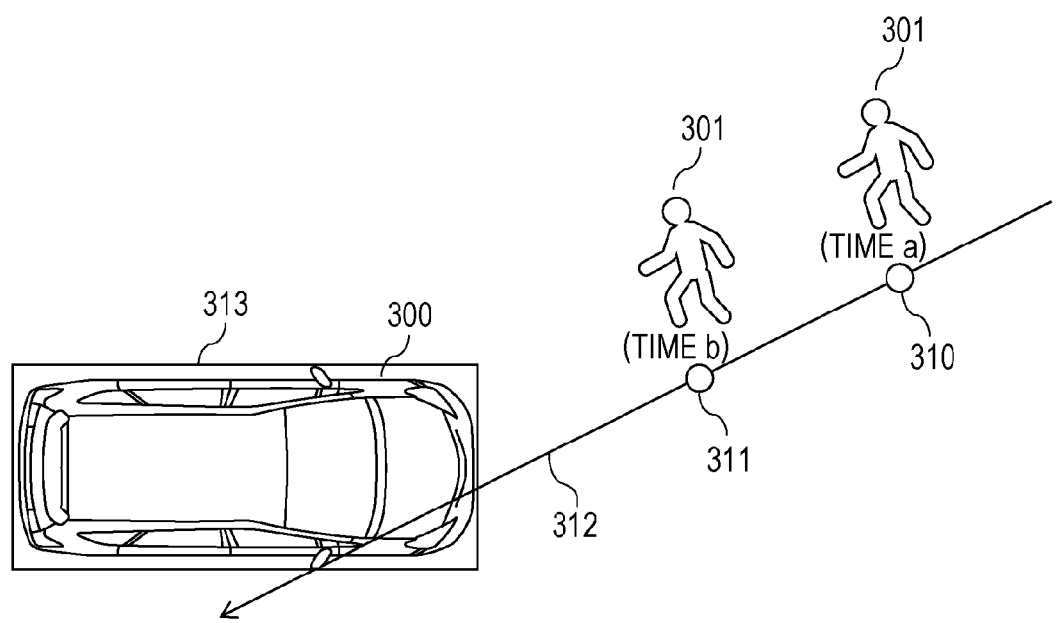
FIG. 3 is a diagram illustrating an example of a time-varying relative positional relationship between a pedestrian and a vehicle according to the first embodiment of the present disclosure.

The determination process performed by the controller 122 is described in further detail with reference to FIG. 3. FIG. 3 illustrates an example of a time-varying relative positional relationship between a pedestrian 301 and a vehicle 300. In FIG. 3, the vehicle 300 and the pedestrian 301 are both moving, and FIG. 3 illustrates the relative position of the pedestrian 301 with respect to the vehicle 300 at time a and that at time b which is a particular period after the time a.

The controller 122 determines whether there is a risk that the vehicle 300 will collide the pedestrian 301 by performing a calculation based on the object location information as of time a and the object location information as of time b. More specifically, in a case where a line 312 passing through an object location 310 as of time a indicated by object location information and an object location 311 as of time b intersects a vehicle existence region 313, the controller 122 determines that there is a risk of collision. On the other hand, the line 312 does not intersect the vehicle existence region 313, the controller 122 determines that there is no risk of collision. Note that the vehicle existence region 313 may be, for example, a rectangular region with a length and a width respectively equal to a length and a width of the vehicle 300.

In a case where the controller 122 determines that there is a risk of collision, the controller 122 calculates a time to collision (TTC) based on the object location 310 as of time a and the object location 311 as of time b. In a case where the calculated TTC is equal to or less than a predetermined value, the controller 122 determines that the driver has to gaze ahead of the vehicle. On the other hand, in a case where it is determined that there is no risk of collision, or in a case where TTC is greater than the predetermined value, the controller 122 determines that it is not necessary for the driver to pay special attention to watching ahead of the vehicle.

The control process performed by the controller 122 is described in further detail below. The controller 122 performs the process differently depending on whether it is determined that it is necessary for the driver to gaze ahead of the vehicle or it is determined that it is not necessary for the driver to pay special attention to watching ahead of the vehicle.

In a case where it is determined that it is not necessary for the driver to pay special attention to watching ahead of the vehicle, the controller 122 controls the image generation apparatus 130 based on the image information so as to generate image data that is to represent the base image when being displayed on the display medium 140. More specifically, for example, the controller 122 controls the image generation apparatus 130 so as to generate image data that is to represent the base image 200 shown in FIG. 2 when being displayed on the display medium 140.

On the other hand, in a case where it is determined that the driver has to pay special attention to watching ahead of the vehicle, the controller 122 controls the image generation apparatus 130 based on the image information and the result of the calculation (for example, a result of calculation associated with a process of deforming an image as described later with reference to FIG. 4) so as to generate image data that is to represent a processed image when being displayed on the display medium 140. More specifically, for example, the controller 122 controls the image generation apparatus 130 based on the image information and the calculation result so as to generate the image data representing a processed image deformed from the base image 200 shown in FIG. 2 over a period with a predetermined length of time since the time at which it is determined that the driver has to pay special attention to watching ahead of the vehicle. The processed image may be, for example, image data representing a processed image (see FIGS. 8B to 8D described later) obtained by deforming element images 201 to 204 of the base image 200 shown in FIG. 2 such that the deformed elements images 201 to 204 change with time with a particular manner. As described above, the processed image includes deformed element images. Note that the image information used by the controller 122 in performing the control is image information that the controller 122 receives from the input device 121 at that time at which the controller 122 determines that the driver has to pay special attention to watching ahead of the vehicle.

According to the control described above, the image generation apparatus 130 performs repeatedly the process of generating image data representing the processed image and the process of outputting the resultant image data to the display medium 140. As a result, the processed image is displayed on the display medium 140 such that the processed image is gradually deformed from the base image 200 (for example, element images 201 to 204 included in the base image 200) as the time elapses. A specific example thereof will be described later.

The controller 122 may control the image generation apparatus 130 such that first, image data is generated by performing a deformation once on the base image 200 thereby obtaining a first processed image, next, image data is generated by performing a deformation once on the first processed image thereby obtaining a second processed image, furthermore, image data is generated by performing a deformation once on the second processed image thereby obtaining a third processed image, and so on.

In a case where it is determined that the driver has to pay special attention to watching ahead of the vehicle, the controller 122 performs the control process as described below with reference to FIG. 4.

Figure 4:
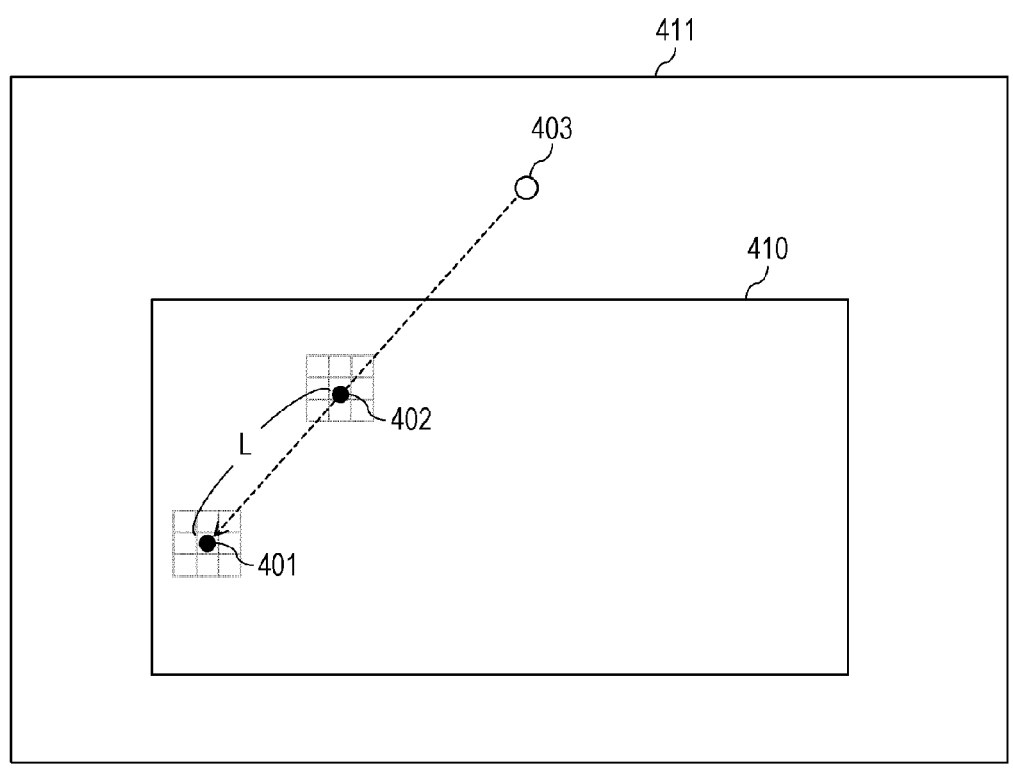
FIG. 4 is a diagram illustrating an example of a control process to deform an image according to the first embodiment of the present disclosure.

FIG. 4 illustrates an image display region 410 and an image space 411. The image display region 410 is a region that is displayed on the display medium 140 and more specifically the image display region 410 is a region in which the base image 200 or the processed image is displayed in a plane seen as being perpendicular to a vehicle running direction. The image space 411 is a region (space) extended from the image display region 410.

In the image display region 410, a pixel 401 of the processed image (that is, the deformed presentation image) and surrounding pixels are displayed. Furthermore, in the image display region 410, coordinates 402 on the base image (that is, the original undeformed presentation image) and surrounding pixels are displayed. The coordinates 402 and the surrounding pixels respectively correspond to a pixel 401 and pixels surrounding it.

In the image space 411, a center point 403 is displayed. The center point 403 is, for example, a movement vanishing point in a view seen ahead. The movement vanishing point in the view seen ahead may be calculated (detected), for example, by the controller 122. The movement vanishing point in the view seen ahead is described in further detail later.

First, the controller 122 calculates the coordinates 402 based on the coordinates of the center point 403 and the coordinates of the pixel 401. More specifically, the controller 122 calculates coordinates 402 that are located on a line passing through the pixel 401 and the center point 403 and that are apart from the pixel 401 by a particular distance L in a direction toward the center point 403.

Next, the controller 122 calculates a luminance value of the pixel 401 from luminance values of pixels surrounding the calculated coordinates 402 using bicubic interpolation.

The process described above is performed for all pixels of the processed image. The controller 122 then outputs the result of the calculation of the luminance values of the pixels and the image information received from the input device 121 to the image generation apparatus 130, and the controller 122 controls the image generation apparatus 130 based on the calculation result and the image information so as to generate image data representing the processed image.

In the example described above, the coordinates of the pixel are calculated by way of example on a pixel-by-pixel basis. Alternatively, coordinates may be calculated in units of a plurality of pixels or in units of sub-pixel areas.

In the present embodiment, elements of the base image 200 are formed in units of one or more pixels.

Next, the movement vanishing point in the view seen ahead is described. The movement vanishing point in the view seen ahead is a starting point of divergence or an ending point of conversion of a movement of a view seen ahead, caused by a movement of the vehicle, in a 2-dimensional plane onto which the view seen ahead of the vehicle is projected. The movement vanishing point in the view seen ahead in a field of view of the driver may be determined as a point at which a line extending in a vehicle running direction from an eye of the driver intersects the image space.

Figure 5A:
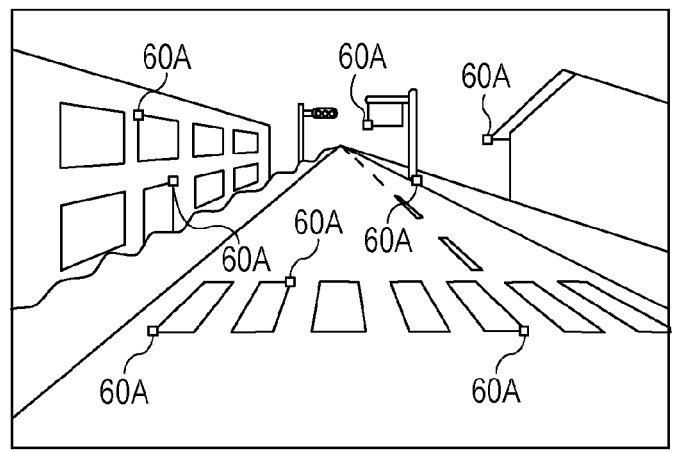
FIGS. 5A to 5C are diagrams illustrating an example of a movement vanishing point in a view seen ahead according to the first embodiment of the present disclosure.
Figure 5B:
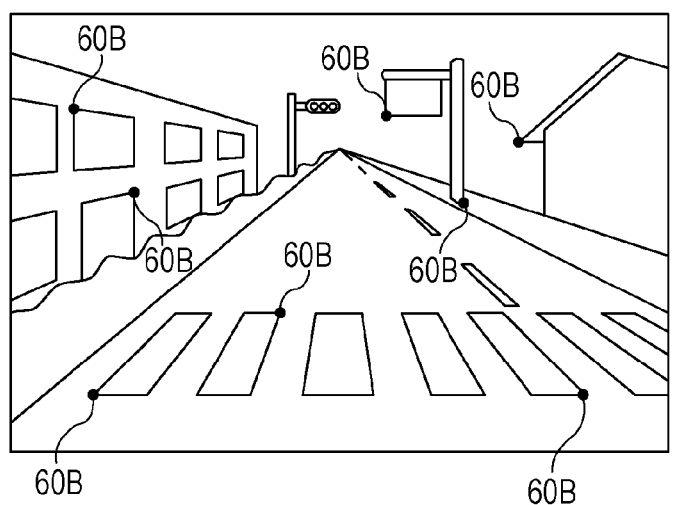
Figure 5C:
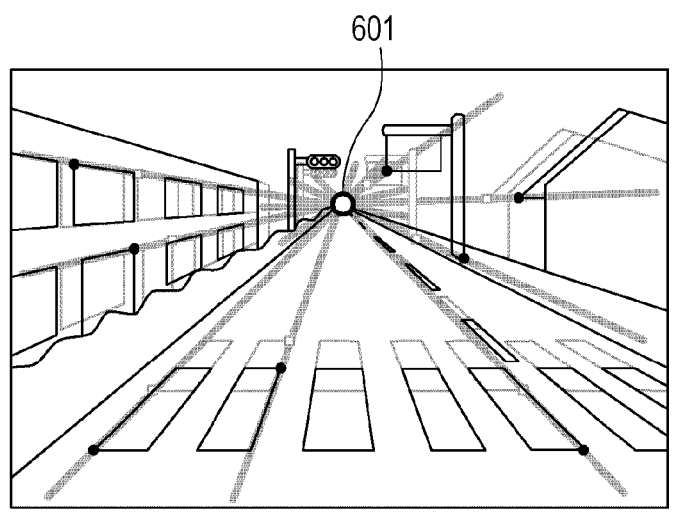

FIG. 5A illustrates a view seen ahead by a driver before a vehicle starts to move. FIG. 5B illustrates a view seen ahead seen by the driver after the vehicle moves. FIG. 5C illustrates a diagram on which FIG. 5A and FIG. 5B are superimposed together. The movement vanishing point is given by a point 601 which is an intersecting point of lines passing through a plurality of open squares 60A shown in FIG. 5A and a plurality of lines passing through solid dots 60B shown in FIG. 5B respectively corresponding to the open squares 60A (see FIG. 5C).

In the present embodiment, a reference location is set at a location defined in advance for a specific vehicle, for example, a location 1.3 meters high from a road surface, 0.5 meters to the right in a lateral direction from the center of the vehicle, 0.3 meters ahead in a longitudinal direction from the center of the vehicle. It is assumed that an eye of a driver is located at the reference location, and that when a vehicle is running straight ahead, the movement vanishing point in the view seen ahead is given by a point where a straight line extending in the running direction of the vehicle from the eye of the driver intersects an image space.

Figure 6:
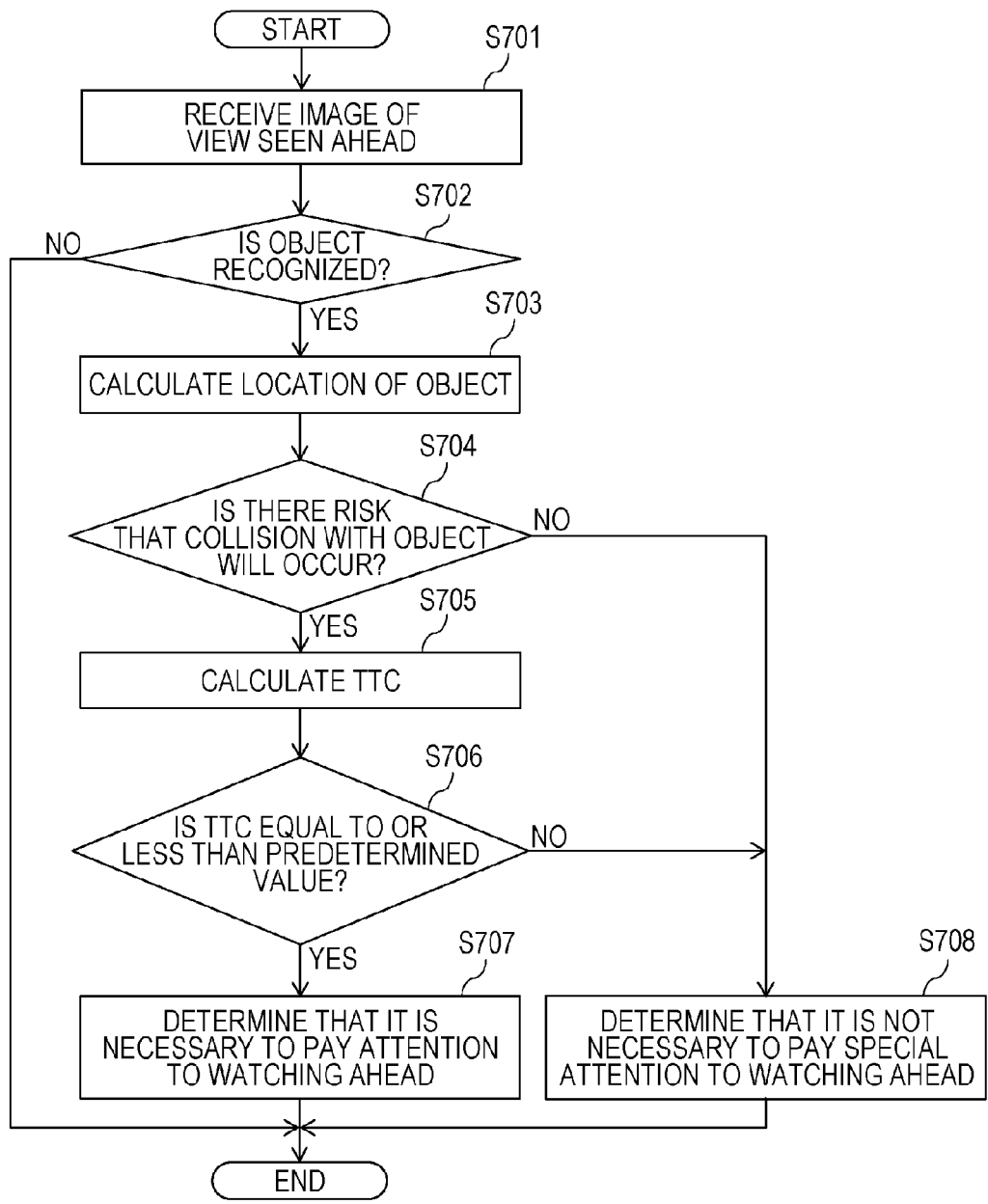
FIG. 6 is a flow chart illustrating an example of an operation flow associated with a recognition apparatus, an input device, and a controller according to the first embodiment of the present disclosure.

Next, a flow of an operation associated with the recognition apparatus 110, the input device 121, and the controller 122 is described below with reference to FIG. 6. FIG. 6 is a flow chart illustrating the flow of the operation associated with the recognition apparatus 110, the input device 121, and the controller 122 shown in FIG. 1.

The recognition apparatus 110 receives an image of a view seen ahead from the detection apparatus (for example, a sensing camera) (step S701).

The recognition apparatus 110 extracts a feature value included in the image of the view seen ahead and recognizes a particular object based on the extracted feature value (step S702).

In a case where the recognition apparatus 110 does not recognize a particular object (No in step S702), the process is ended.

On the other hand, in a case where the recognition apparatus 110 recognizes a particular object (Yes in step S702), the recognition apparatus 110 calculates the location of the object (step S703). Herein, let it be assumed by way of example that the recognition apparatus 110 recognizes a pedestrian and calculates the location thereof.

In this case, the recognition apparatus 110 then outputs object location information indicating the calculated location of the pedestrian to the input device 121. When the input device 121 receives the object location information from the recognition apparatus 110, the input device 121 outputs the received object location information to the controller 122.

The controller 122 performs a determination based on the object location information as to whether there is a risk that the pedestrian will collide with the vehicle (step S704).

In a case where the controller 122 determines that there is no risk (No in step S704), the controller 122 determines that it is not necessary for the driver to pay special attention to watching ahead of the vehicle (step S708), and the controller 122 ends the process.

On the other hand, in a case where it is determined that there is a risk (Yes in step S704), the controller 122 calculates a time to collision (TTC) with the pedestrian (step S705), and determines where TTC is smaller than a predetermined value (step S706).

In a case where it is determined that TTC is greater than the predetermined value (No in step S706), the controller 122 determines that it is not necessary for the driver to pay special attention to watching ahead of the vehicle (step S708), and the controller 122 ends the process.

On the other hand, in a case where it is determined that TTC is equal to or smaller than the predetermined value (Yes in step S706), the controller 122 determines that it is necessary for the driver to gaze ahead of the vehicle (step S707), and the controller 122 ends the process.

Figure 7:
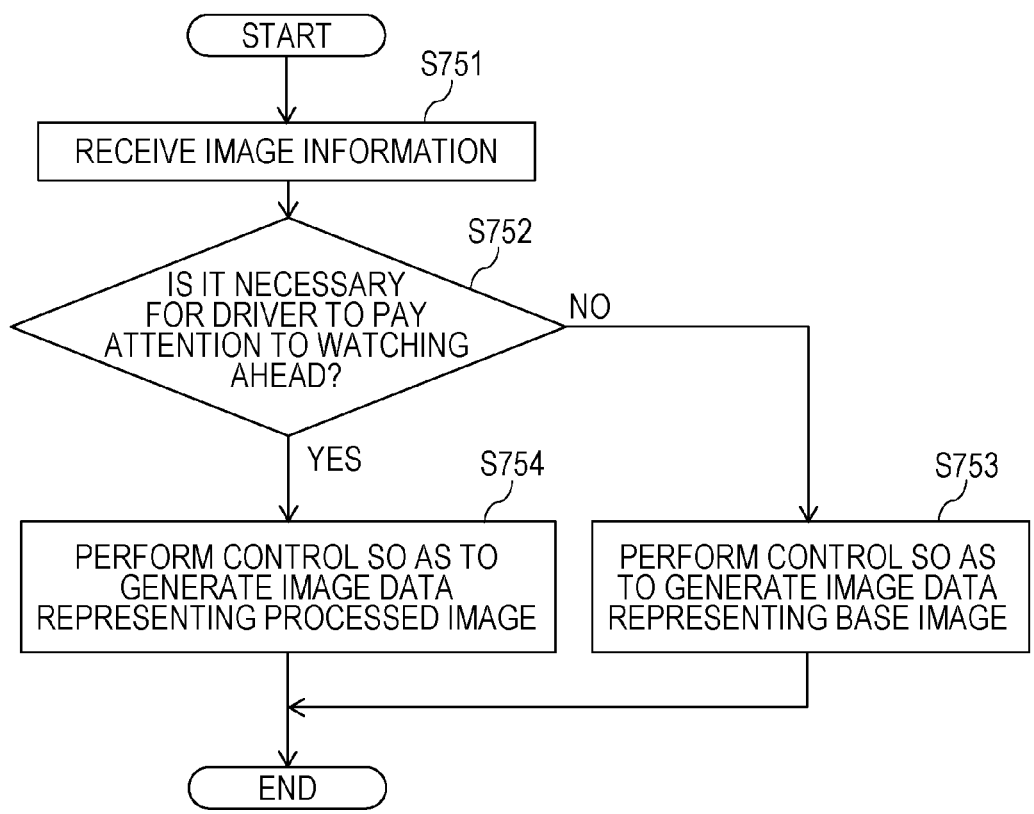
FIG. 7 is a flow chart illustrating an example of an operation flow associated with a display control apparatus according to the first embodiment of the present disclosure.

The flow of the operation associated with the display control apparatus 120 is described below with reference to FIG. 7. FIG. 7 is a flow chart illustrating the flow of the operation associated with the display control apparatus 120 shown in FIG. 1.

The input device 121 receives image information from a particular apparatus and outputs the received image information to the controller 122 (step S751).

In a case where the controller 122 determines that it is not necessary for the driver to pay special attention to watching ahead of the vehicle (No in step S752), the controller 122 controls, based on the image information, the image generation apparatus 130 to generate image data that is to display a base image when being displayed on the display medium 140 (step S753). For example, the controller 122 controls the image generation apparatus 130 so as to generate image data that is to represent the base image 200 when being displayed on the display medium 140. According to the control described above, the image generation apparatus 130 generates the image data that is to represent the base image 200 when being displayed on the display medium 140, and outputs the resultant image data to the display medium 140. As a result, a vehicle occupant of the vehicle can view the base image 200.

On the other hand, in a case where it is determined that it is necessary for the driver to gaze ahead of the vehicle (Yes in step S752), the controller 122 controls the image generation apparatus 130 based on the image information and the calculation result (for example, luminance values of pixels) so as to generate image data that is to represent the processed image when being displayed on the display medium 140 (step S754). For example, the controller 122 controls the image generation apparatus 130 to generate image data that is to represent a processed image (for example, an image including deformed element images 201 to 204) that is to be deformed, depending on passing time, from the base image 200 (for example, the element images 201 to 204) when being displayed on the display medium 140 for a predetermined value. According to the control described above, the image generation apparatus 130 generates the image data that is to represent the processed image when being displayed on the display medium 140, and outputs the resultant image data to the display medium 140. As a result, a vehicle occupant of the vehicle can view the processed image.

To generate image data representing the processed image, the image generation apparatus 130 may perform a first example of a control process or a second example of a control process described below.

First Example of Control Process

The controller 122 controls the image generation apparatus 130 such that on the display medium 140, element images included in a base image (which is an example of an original undeformed presentation image) are moved away radially from the movement vanishing point in the view seen ahead toward at least one of sides of the display medium 140 and thus deformed element images (which form an example of deformed presentation image) sequentially disappear to the outside of the display medium 140 across its edges.

Second Example of Control Process

The controller 122 controls the image generation apparatus 130 such that on the display medium 140, element images included in the base image (the original undeformed presentation image) are moved toward the movement vanishing point in the view seen ahead such that they converge at the movement vanishing point in the view seen ahead.

The second example of the control process is described in further detail below with reference to FIG. 4. the controller 122 determines coordinates 401 of a pixel of the base image by calculating the coordinates obtained by moving coordinates 402 of a pixel of the processed image by a particular distance L on a line passing through the coordinate 402 and a center point 403 in a direction away from the center point 403. Next, the controller 122 calculates a luminance value of the pixel of the processed image corresponding to the coordinate 402 from a luminance value of the pixel of the base image corresponding to the calculated coordinates 401 and from luminance values of pixels surrounding the pixel of the base image using bicubic interpolation. The calculation described above is performed for all pixels of the processed image. The controller 122 controls the image generation apparatus 130 based on the calculation result and the image information so as to generate image data representing the processed image.

Next, examples are described below as to sequential changes of a presentation image displayed on the display medium 140 as a result of the above-described control process by the controller 122.

First Example of Sequence of Changes of Presentation Image

Referring to FIGS. 8A to 8D, a description is given below as to a first example of a sequence of changes of a presentation image that may occur when the first example of the control process is performed. FIGS. 8A to 8D are diagrams illustrating a first example of a sequence of changes of a presentation image according to the first embodiment of the present disclosure.

Figure 8A:
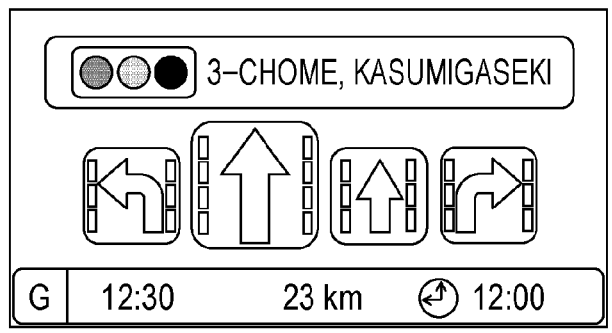
FIGS. 8A to 8D are diagrams illustrating a first example of a sequence of changes in a presentation image according to the first embodiment of the present disclosure.
Figure 8B:
Figure 8C:
Figure 8D:

When a base image shown in FIG. 8A (which is the same as the base image 200 shown in FIG. 2) is displayed on the display medium 140, if it is determined that it is necessary for a driver to gaze ahead of a vehicle, then the image displayed on the display medium 140 is changed as time passes as follows: a processed image shown in FIG. 8B is first displayed; then a processed image shown in FIG. 8C is displayed; and finally, a processed image shown in FIG. 8D is displayed.

As shown in FIGS. 8A to 8D, in a case where it is determined that it is necessary for the driver to gaze ahead of the vehicle, the base image 200 is changed with time such that the element images of the base image 200 are deformed (so as to diverge) in radial directions from the center given by the movement vanishing point in the view seen ahead such that the deformed element images move toward one side of the display medium 140 (a bottom side in the example shown in FIGS. 8A to 8D), and finally the deformed element images disappear to the outside of the display medium 140 across edges thereof.

Second Example of Sequence of Changes of Presentation Image

Referring to FIGS. 9A to 9D, a description is given below as to a second example of a sequence of changes of a presentation image that may occur when the first example of the control process is performed. FIGS. 9A to 9D are diagrams illustrating a second example of a sequence of changes of a presentation image.

Figure 9A:
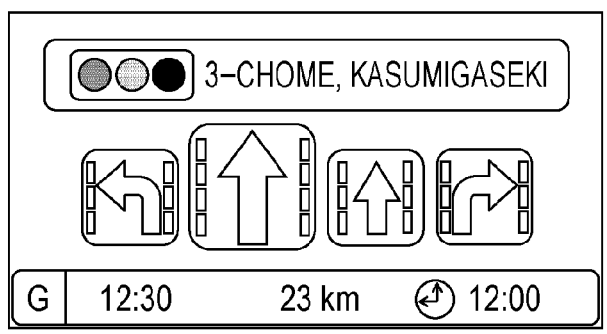
FIGS. 9A to 9D are diagrams illustrating a second example of a sequence of changes in a presentation image according to the first embodiment of the present disclosure.
Figure 9B:
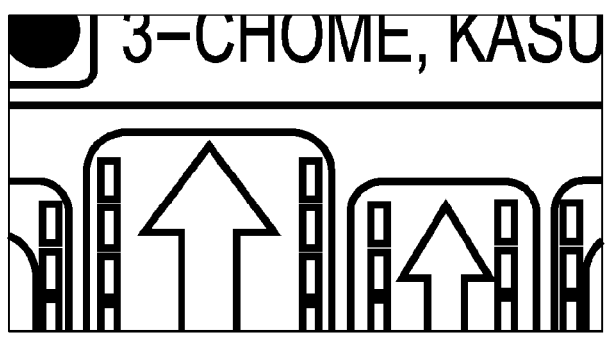
Figure 9C:
Figure 9D:

When a base image shown in FIG. 9A (which is the same as the base image 200 shown in FIG. 2) is displayed on the display medium 140, if it is determined that it is necessary for the driver to gaze ahead of a vehicle, then the image displayed on the display medium 140 is changed as time passes as follows: a processed image shown in FIG. 9B is first displayed; then a processed image shown in FIG. 9C is displayed; and finally, a processed image shown in FIG. 9D is displayed.

As shown in FIGS. 9A to 9D, in a case where it is determined that it is necessary for the driver to gaze ahead of a vehicle, the element images of the base image 200 are moved radially (so as to diverge) with time away from the center given by the movement vanishing point in the view seed ahead such that the element images move toward sides (upper, lower, left, and right sides in the example shown in FIGS. 9A to 9D) of the display medium 140, and finally the deformed element images disappear to the outside of the display medium 140 crossing edges thereof.

Third Example of Sequence of Changes of Presentation Image

Referring to FIGS. 10A to 10D, a description is given below as to a third example of a sequence of changes of a presentation image that may occur when the second example of the control process is performed. FIGS. 10A to 10D are diagrams illustrating a third example of a sequence of changes of a presentation image.

Figure 10A:
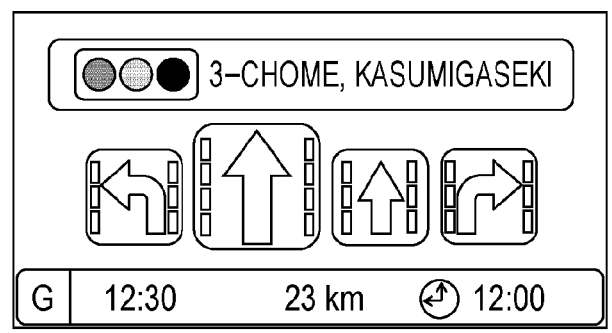
FIGS. 10A to 10D are diagrams illustrating a third example of a sequence of changes in a presentation image according to the first embodiment of the present disclosure.
Figure 10B:
Figure 10C:
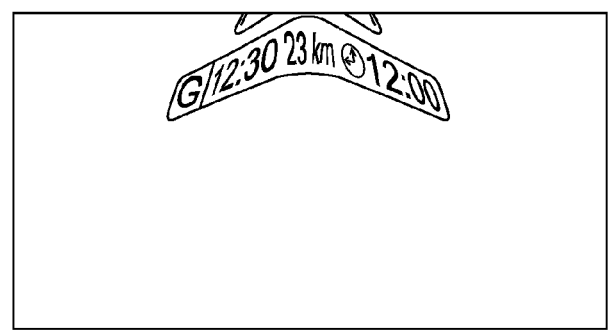
Figure 10D:
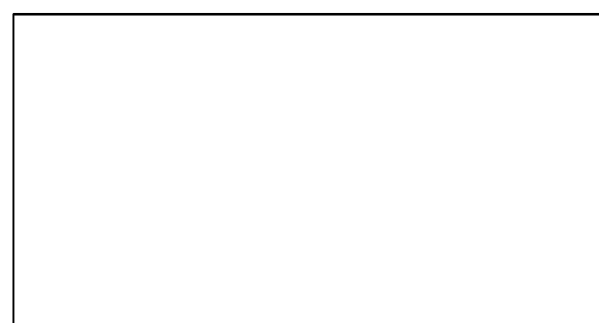

When a base image shown in FIG. 10A (which is the same as the base image 200 shown in FIG. 2) is displayed on the display medium 140, if it is determined that it is necessary for the driver to gaze ahead of a vehicle, then the image displayed on the display medium 140 is changed as time passes as follows: a processed image shown in FIG. 10B is first displayed; then a processed image shown in FIG. 100 is displayed; and finally, a processed image shown in FIG. 10D is displayed.

As shown in FIGS. 10A to 10D, in a case where it is determined that it is necessary for a driver to gaze ahead of a vehicle, the element images of the base image 200 are moved with time toward the movement vanishing point in the view seen ahead, and finally the moving element images sequentially disappear at the movement vanishing point.

In the first embodiment described above, the original undeformed presentation image displayed on the display medium 140 is changed such that element images thereof are moved radially away from a moving center point, which is the starting point of the flowing movement of the view seen ahead and which is given by the movement vanishing point in the view seen ahead, toward at least one of the sides of the display medium 140 such that the presentation image disappears to the outside of the display medium 140. This manner of changing the presentation image fits with the flow of the view seen ahead. Therefore, in a state in which the driver looks, by peripheral vision, at the presentation image displayed on the display medium 140 while watching ahead of the vehicle, the change in the presentation image displayed on the display medium 140 fits with the flow of the view seen ahead and thus the change in the presentation image is not very perceivable by the driver, which prevents the attention of the driver from being paid to the display medium 140. On the other hand, when the driver is paying attention to the presentation image displayed on the display medium 140, the change in the presentation image displayed on the display medium 140 is perceived by the driver, which prompts the driver to pay attention back to watching ahead of the vehicle. That is, by changing the image in the above-described manner without suddenly deleting the content of the image, which may bother the driver, it becomes possible to prevent the attention of the driver from being unnecessarily paid to the display. Thus it is possible make a contribution to enhancement of safety in driving.

In another mode of the first embodiment, the original undeformed presentation image displayed on the display medium 140 is deformed and the deformed image is moved toward the point that is the starting point of the flowing movement of the view seen ahead and that is given by the movement vanishing point in the view seen ahead. When the driver is paying attention to the presentation image displayed on the display medium 140, if the presentation image is changed in the above-described manner, the direction in which the image is moved toward the movement vanishing point in the view seen ahead is the same as the vehicle running direction, and thus it is possible to prompt the driver to pay attention back to the view ahead of the vehicle. That is, the displayed image is controlled so as not to have an abrupt change such as sudden disappearance, which would cause the driver to pay unnecessary attention to the display, but the presentation image is changed in the above-described manner to ensure an improvement in safety in driving.

The present disclosure has been described above with reference to the first embodiment. However, the present disclosure is not limited to the first embodiment, but various modifications are possible. Some examples of modifications are described below.

First Modification

In the first embodiment described above, it is assumed by way of example that the base image is changed with respect to the movement vanishing point in the view seen ahead. However, the reference point is not limited to the movement vanishing point in the view seen ahead, but the reference point may be selected arbitrarily as long as similar effects are achieved. For example, a point in the image space including the original undeformed presentation image, a point on the display medium, or other points may be employed.

Second Modification

In the first embodiment described above, it is assumed by way of example that the display medium 140 is of a type that allows light to pass through. However, the display medium 140 is not limited to this type, but the display medium 140 may be a medium that does not allow light to pass through. Furthermore, it is assumed by way of example that the display medium 140 is disposed at a height lower than the eyepoint of the driver. However, the location of the display medium 140 is not limited to this, but the display medium 140 may be disposed at another location. For example, the display medium 140 may be disposed at a location substantially the same as or higher than the eyepoint of the driver.

Third Modification

In the first embodiment described above, it is assumed by way of example that the image 410 is displayed on the display medium 140 such that the image plane is perpendicular to the vehicle running direction. However, the image plane does not need to be exactly perpendicular to the vehicle running direction. The image plane may be a flat pane or a curved surface. In a case where the image is displayed on a curved surface, the image may be changed such that the change occurs in a virtual plane perpendicular to the running direction of the vehicle.

Fourth Modification

In the first embodiment described above, it is assume by way of example that the bicubic interpolation method is used as an interpolation method to calculate luminance values of pixels of the changing image from luminance values of pixels surrounding the calculated coordinates 402. However, the method is not limited to this. For example, a nearest neighbor interpolation method, a bilinear interpolation method, or other interpolation methods may be employed.

Fifth Modification

In the first embodiment described above, it is assumed by way of example that the controller 122 calculates the original undeformed coordinates from the processed coordinates of pixels each time deformation is performed, and, from luminance values of pixels surrounding the calculated coordinates, luminance values of changed pixels are calculated using the interpolation. Alternatively, a table may be prepared in advance that indicates a correspondence between a luminance value of a pixel as of after the deformation and a luminance value of a pixel as of before the deformation, the deformation may be determined according to the table.

Sixth Modification

In the first embodiment described above, the controller 122 receives image information from the input device 121 at that time when it is determined that it is necessary for a driver to gaze ahead of a vehicle, and, based on the received image information, the controller 122 controls the image generation apparatus 130 so as to generate a processed image changing with time for a particular period after the time at which the above-described determination is made. However, the manner of controlling the image generation apparatus 130 is not limited to this. Alternatively, for example, the controller 122 may receive image information from the input device 121 each time a processed image is generated, and the controller 122 may control the image generation apparatus 130 based on the received image information so as to generate the processed image by changing the particular distance L.

Seventh Modification

In the first embodiment described above, the controller 122 may perform the control such that the speed of changing the image is changed depending on the distance of a point on the image from the center point, that is, the particular distance L shown in FIG. 4 is changed depending on the distance of a point on the image from the center point.

The view seen ahead moves such that a part close to the movement vanishing point moves slowly and the movement speed increases with the distance from the movement vanishing point. Therefore, by changing moving speeds of respective parts of the image depending on the distance of the part of the image from the center point, it becomes possible to move the image in synchronization with the movement of the view seen ahead. Thus when the driver is watching ahead of the vehicle, the change in the image displayed on the display medium 140 is not very perceivable by the driver.

In the method described above, the moving speeds of respective parts of the image are changed depending on the distances of the parts of the image from the center point, but the manner of changing the moving speed is not limited to this. For example, the moving speeds of respective parts of the image may be changed depending on the distances of the respective parts in a vertical direction on the image from the center point, or depending on the distances of the respective parts in a horizontal direction on the image from the center point.

Eighth Modification

In the first embodiment described above, it is assumed by way of example that the display system 100 includes the image generation apparatus 130, but the display system 100 may not include the image generation apparatus 130. Furthermore, in the first embodiment described above, it is assumed by way of example that the display system 100 includes the display medium 140, but the display system 100 may not include the display medium 140. Note that the this modification may also be applied to a display system according to any embodiment described below.

Ninth Modification

In the first embodiment described above, it is assumed by way of example that the display system 100 is applied to a vehicle, but the present disclosure is not limited to this. The display system 100 may be applied to other types of moving objects. Note that the this modification may also be applied to a display system according to any embodiment described below.

Tenth Embodiment

In the first embodiment described above, it is assumed by way of example but not limitation that the input device 121 receives image information from a peripheral device, which is a device other than the detection apparatus. Alternatively, the input device 121 may receive image information from the detection apparatus. For example, in a case where the detection apparatus is a sensing camera, the input device 121 may receive, as the image information, information associated with an image of the view seen ahead. The controller 122 then may control the image generation apparatus 130 based on this information on the image of the view seen ahead so as to generate image data representing a presentation image. For example, in a case where the image of the view seen ahead includes an image of a road sign, the controller 122 may recognize the image of the road sign and may extract this recognized image from the image of the view seen ahead. The controller 122 then may perform particular processing on the extracted image of the road sign and may control the image generation apparatus 130 so as to generate image data representing the processed image of the road sign (as the presentation image).

Eleventh Modification

In the first embodiment described above, it is assumed by way of example but not limitation that the recognition apparatus 110 recognizes an object (pedestrian). In addition to the object, the recognition apparatus 110 may further recognize, for example, a change in weather, a change in brightness, etc. For example, in a case where the recognition apparatus 110 recognizes that a change has occurred from fine weather to rainy weather, or in a case where the recognition apparatus 110 recognizes a reduction in brightness to a value equal to or smaller than a particular value, if the controller 122 receives such a recognition result from the recognition apparatus 110 via the input device 121, the controller 122 may control the image generation apparatus 130 so as to perform an image deformation process on the presentation image in a similar manner to the case where the image deformation process is performed when it is determined that it is necessary for a driver to gaze ahead of a vehicle.

Twelfth Modification

In the first embodiment, as described above with reference to FIG. 4, the controller 122 calculates coordinates 402 that are located on a line passing through the pixel 401 on the processed image (that is, the deformed presentation image) and the center point 403 (the movement vanishing point in the view seen ahead) such that the point of coordinates 402 is apart from the pixel 401 by a particular distance L in a direction toward the center point 403. However, the method of calculating the coordinates 402 is not limited to this.

Alternative example of a method of calculating the coordinates 402 is described below with reference to FIG. 11. In FIG. 4, similar elements to those in FIG. 4 are denoted by similar reference symbols or numerals to those in FIG. 4, and a further duplicated description thereof is omitted.

Figure 11:
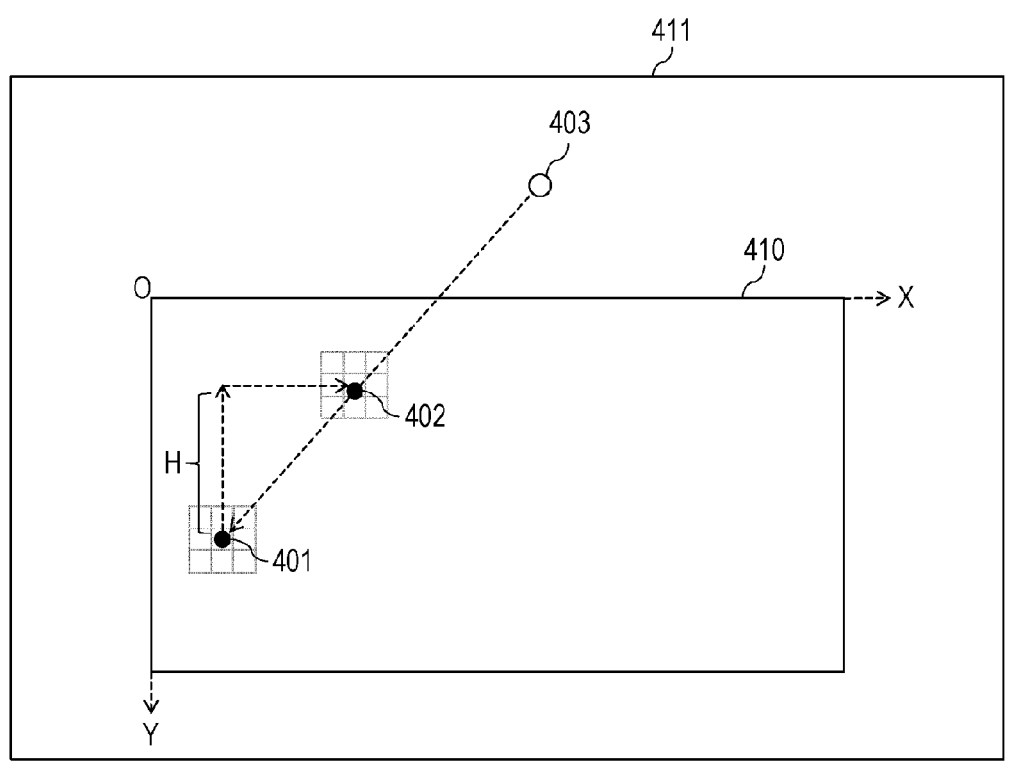
FIG. 11 is a diagram illustrating an example of a control process of deforming an image according to a twelfth modification to the first embodiment of the present disclosure.

In FIG. 11, it is assumed that an origin O is located at an upper left corner of an image display region 410. Furthermore, an X axis is defined by a line extending from the origin O in a direction along a longer side of the image display region 410, and a Y axis is defined by a line extending from the origin O in a direction along a shorter side of the image display region 410.

The controller 122 moves the pixel 401 by a particular distance H in a negative direction along the Y axis and determines a line extending from this resultant point in a horizontal direction. Furthermore, the controller 122 calculates coordinates 402 of a point at which this line intersects another line extending from the pixel 401 toward the center point 403.

From luminance values of pixels surrounding the calculated coordinates 402, the controller 122 calculates a luminance value of the pixel 401 by using the bicubic interpolation method.

The process described above is performed for all pixels of the processed image. The controller 122 then outputs the result of the calculation of the luminance values of the pixels and the image information received from the input device 121 to the image generation apparatus 130, and the controller 122 controls the image generation apparatus 130 so as to generate image data representing the processed image based on the calculation result and the image information.

In the example described above, the coordinates of the pixel are calculated by way of example on a pixel-by-pixel basis. Alternatively, coordinates may be calculated in units of a plurality of pixels or in units of sub-pixel areas.

Referring to FIGS. 12A to 12D, a description is given below as to an example of sequence of changes in a presentation image that may occur when the control is performed in the above-described manner. That is, FIGS. 12A to 12D are diagrams illustrating an example of a sequence of changes in a presentation image according to the present modification.

Figure 12A:
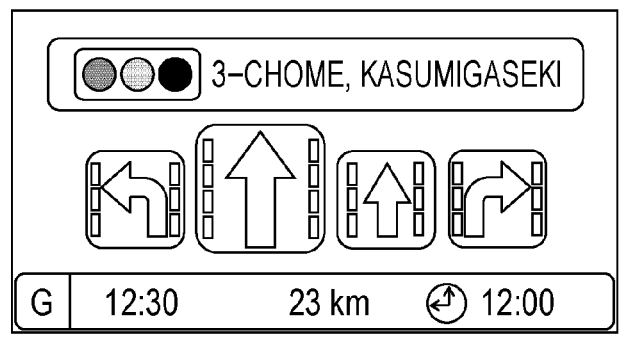
FIGS. 12A to 12D are diagrams illustrating an example of a sequence of changes in a presentation image according to the twelfth modification to the first embodiment of the present disclosure.
Figure 12B:
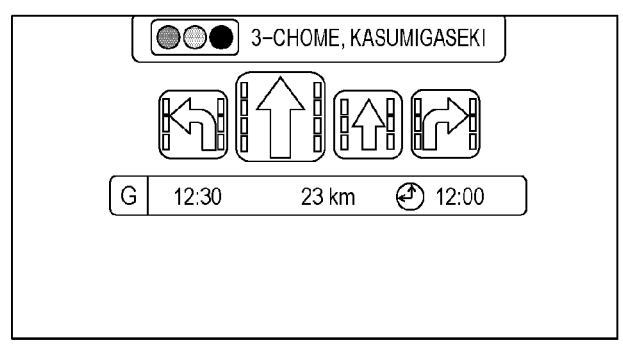
Figure 12C:
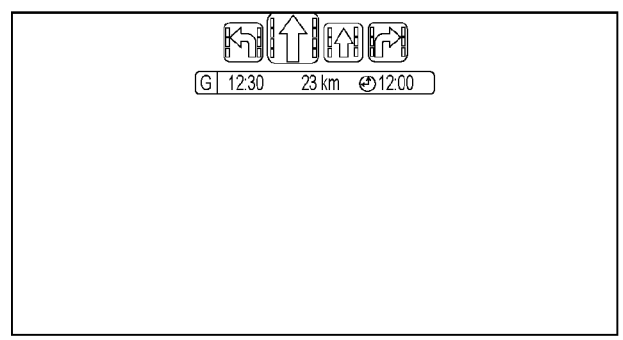
Figure 12D:

When a base image shown in FIG. 12A (which is the same as the base image 200 shown in FIG. 2) is displayed on the display medium 140, if it is determined that it is necessary for a driver to gaze ahead of a vehicle, then the image displayed on the display medium 140 is changed as time passes as follows: a processed image shown in FIG. 12B is first displayed; then a processed image shown in FIG. 12C is displayed; and finally, a processed image shown in FIG. 12D is displayed.

As shown in FIGS. 12A to 12D, in a case where it is determined that it is necessary for a driver to gaze ahead of a vehicle, the element images of the base image 200 are deformed with time such that they converge toward the movement vanishing point in the view seen ahead, and finally the deformed element images sequentially disappear at the movement vanishing point.

Second Embodiment

Figure 13:
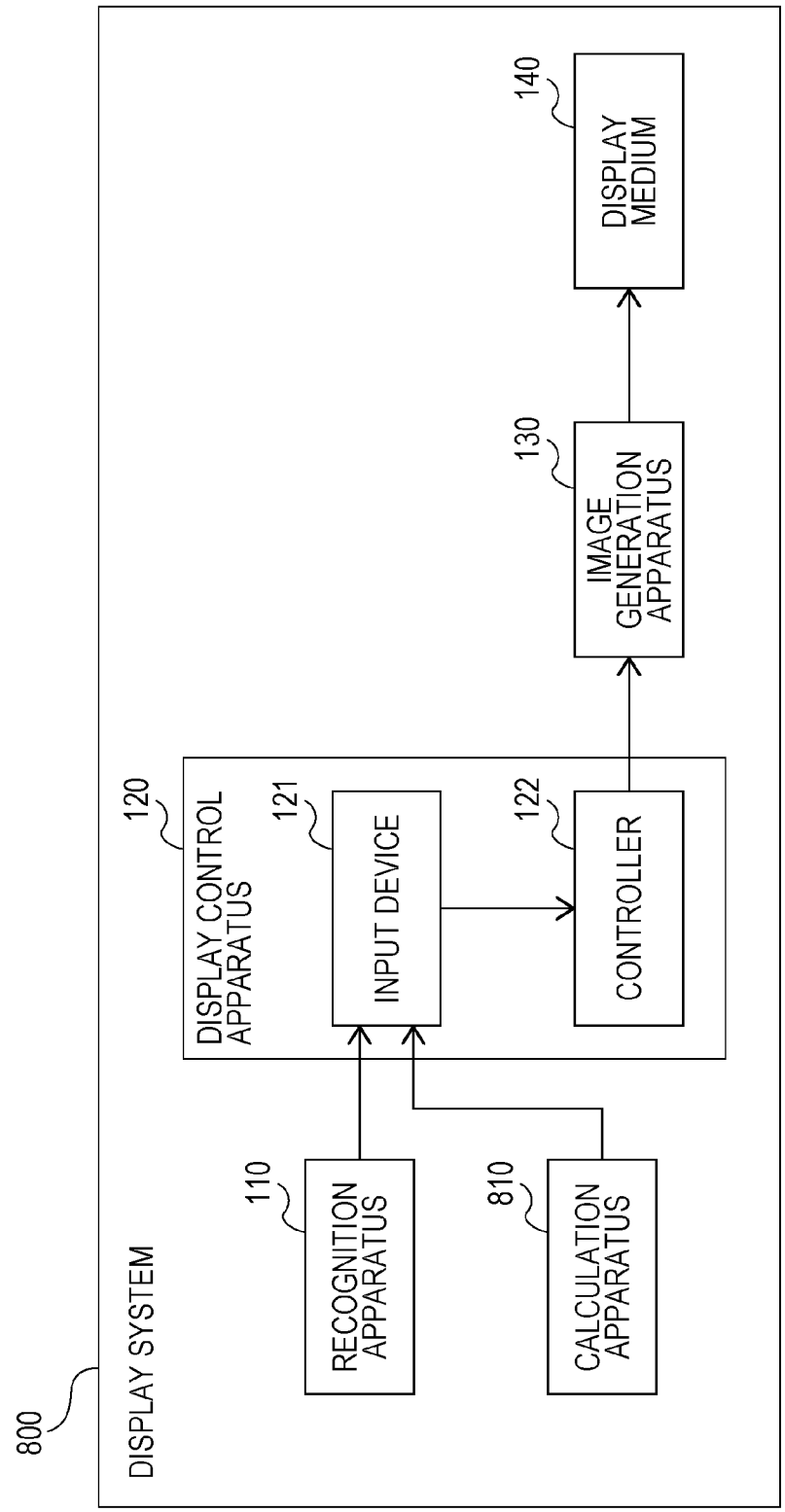
FIG. 13 is a block diagram illustrating an example of a configuration of a display system including a display control apparatus according to a second embodiment of the present disclosure.

FIG. 13 is a block diagram illustrating an example of a configuration of a display system 800 according to a second embodiment of the present disclosure. The display system 800 shown in FIG. 13 is different from the display system 100 shown in FIG. 1 in that a calculation apparatus 810 is additionally provided.

The calculation apparatus 810 calculates a plurality of flow vectors indicating moving distances and moving directions of an object by an optical flow based on a plurality of images of the view seen ahead received from a detection apparatus (for example, a sensing camera (not shown)). The detection apparatus, which outputs the image of the view seen ahead to the calculation apparatus 810, may be the same as or may be different from the detection apparatus that outputs the image of the view seen ahead to the recognition apparatus 110.

Figure 14A:
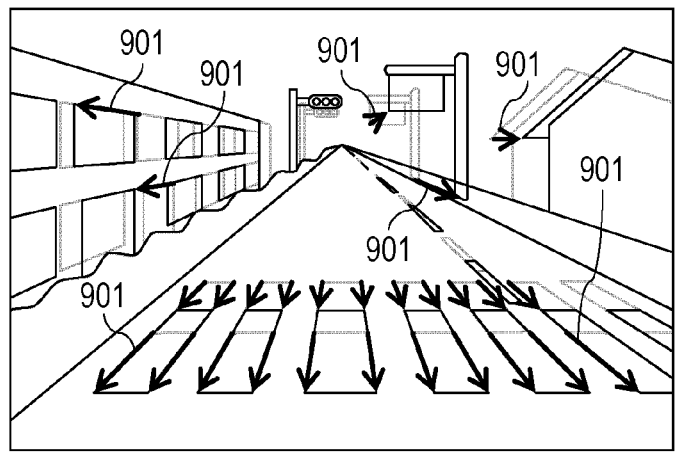
FIGS. 14A and 14B are diagrams illustrating a process performed by a calculation apparatus according to the second embodiment of the present disclosure.

The optical flow is a vector field representing a speed of an object in time-sequentially captured images. The flow vector is a vector representing a velocity of an object in the optical flow. FIG. 14A illustrates a manner in which a plurality of calculated flow vectors 901 are superimposed on an image of the view seen ahead.

Figure 14B:
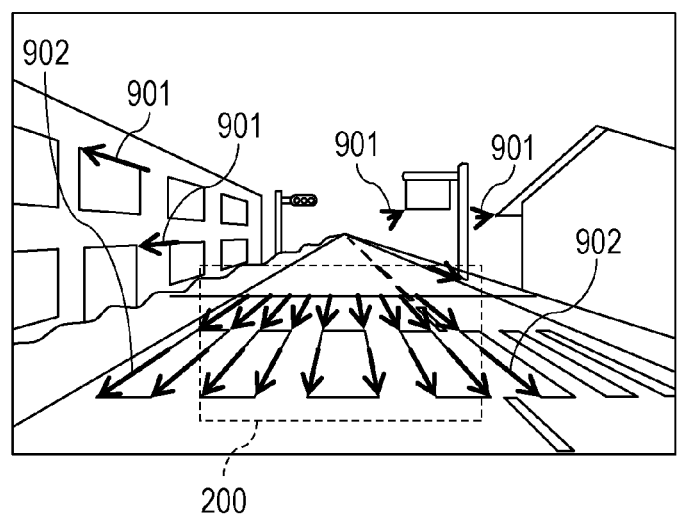

The calculation apparatus 810 performs a projective transformation on the flow vectors 901 in the image of the view seen ahead thereby calculating flow vectors 902 as shown in FIG. 14B in an image space 411 (see FIG. 4) in which an eye of a driver is assumed to be located at the reference location. Note that in FIG. 14B, to provide a better understanding, the base image 200 is described in a simplified manner only by a dotted line.

The calculation apparatus 810 outputs the calculated flow vectors 902 to the input device 121 of the display control apparatus 120. The input device 121 outputs the received flow vectors 902 to the controller 122.

The process of calculating the flow vectors based on the optical flow from a plurality of images, and the projective transformation process to transform the flow vectors from a camera coordinate system to a driver coordinate system are known and thus a further detailed description thereof is omitted.

In a case where it is determined that it is necessary for the driver to gaze ahead of the vehicle, the controller 122 controls the image generation apparatus 130 so as to generate a processed image (for example, an image deformed from the base image 200) based on the flow vectors 902 and the image information. More specifically, the magnitude and the direction of each flow vector 902 respectively represent the moving distance and the moving direction of a pixel located at coordinates of the starting point of the flow vector 902. Furthermore, the controller 122 calculates moving distances and moving directions of pixels at other coordinates by performing linear interpolation on the moving distance and the moving direction at the coordinates of the starting point of the flow vector 902. The controller 122 then controls the image generation apparatus 130 so as to generate a processed image by moving pixels of the base image 200 according to the moving distances and the moving directions calculated for the respective pixels. According to the control described above, the image generation apparatus 130 generates image data representing the processed image and outputs the resultant image data to the display medium 140. Thus, the processed image is displayed on the display medium 140.

The flow of the operation associated with the display control apparatus 120 is described below with reference to FIG. 15. FIG. 15 is a flow chart illustrating an example of an operation flow associated with a display control apparatus 120 according to the second embodiment of the present disclosure. In FIG. 15, similar elements to those in FIG. 7 are denoted by similar reference symbols or numerals to those in FIG. 7, and a further duplicated description thereof is omitted.

In a case where it is necessary for the driver to gaze ahead of the vehicle (Yes in step S752), the controller 122 receives a flow vector in an image space 411 from the calculation apparatus 810 via the input device 121 (step S1001).

The controller 122 controls, based on the flow vector and the image information, the image generation apparatus 130 so as to generate image data representing the processed image (step S1002). According to the control described above, the image generation apparatus 130 generates, based on the flow vector, the image data that is to represent the processed image when being displayed on the display medium 140, and the image generation apparatus 130 outputs the resultant image data to the display medium 140. As a result, a vehicle occupant of the vehicle can view the processed image.

In the display system 800 according to the second embodiment, as described above, the flow vector is calculated from the image of the view seen ahead, and the base image 200 is deformed based on the calculated flow vector. As a result, the image superimposed on the view seen ahead is deformed such that the amount of change and the change in direction are the same as those of the view seen ahead. For example, in a case where there is another vehicle running in a lateral direction in front of the present vehicle, an image part superimposed on this vehicle is deformed in a direction in which the vehicle moves. Therefore, when the driver is watching ahead of his/her vehicle, if a change occurs in the above-described manner in the image displayed on the display medium 140, this change is not very perceivable by the driver, which prevents the attention of the driver from being paid to the display medium 140.

Although in the present embodiment, it is assumed by way of example but not limitation that the controller 122 employs linear interpolation to calculate moving distances and moving directions of respective pixels from the moving distance and the moving direction at the coordinates of the starting point of the flow vector. Alternatively, other methods such as spline interpolation, Lagrange interpolation, or the like may be employed as long as it is possible to calculate flow vectors of pixels.

Although in the present embodiment, it is assumed by way of example but not limitation that the controller 122 calculates moving distances and moving directions of respective pixels by performing interpolation on the moving distance and the moving direction at the coordinates of the starting point of the flow vector, an alternative calculation method may be employed. For example, a moving distance and a moving direction at coordinates of a starting point of a flow vector located closest to each pixel may be directly employed as the moving distance and the moving direction for the pixel.

Third Embodiment

Figure 16:
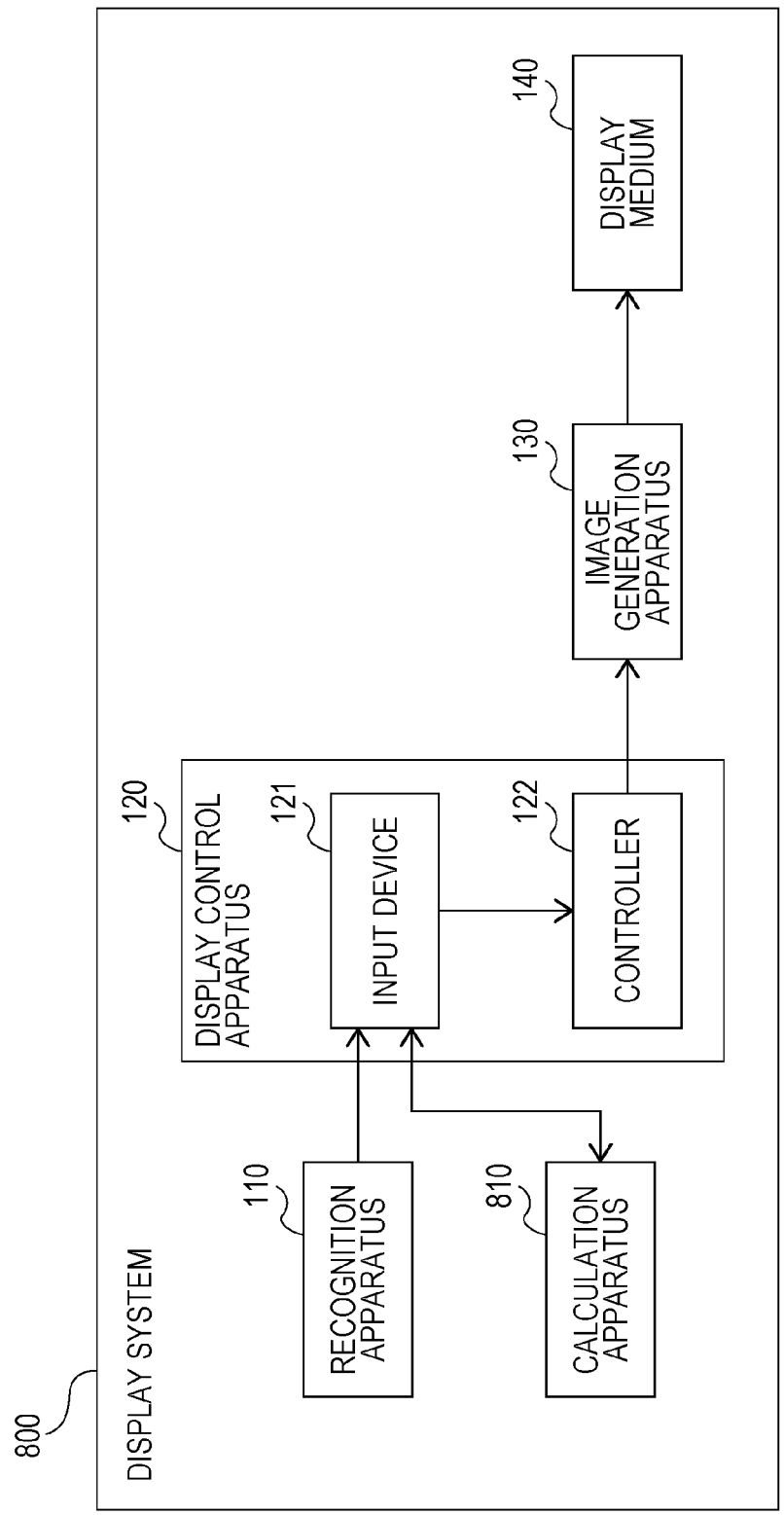
FIG. 16 is a block diagram illustrating an example of a configuration of a display system including a display control apparatus according to a third embodiment of the present disclosure.

FIG. 16 is a block diagram illustrating an example of a configuration of a display system 1100 according to a third embodiment of the present disclosure. The display system 1100 shown in FIG. 16 is different from the display system 800 shown in FIG. 13 in that information is transmitted from the controller 122 to the calculation apparatus 810 via the input device 121. This information is information indicating a result of a determination by the controller 122 (as to whether it is necessary for a driver to gaze ahead of a vehicle).

The detection apparatus (for example, a sensing camera (not illustrated)) calculates 3-dimensional coordinates of a feature point of an object being captured, from a plurality of images of the view seen ahead captured time-sequentially. The detection apparatus outputs information representing the calculated 3-dimensional coordinates (hereinafter referred to as "3-dimensional spatial information") to the calculation apparatus 810. The detection apparatus, which outputs the 3-dimensional spatial information to the calculation apparatus 810, may be the same as or may be different from the detection apparatus that outputs the image of the view seen ahead to the recognition apparatus 110.

In a case where the controller 122 determines that it is necessary for the driver to gaze ahead of the vehicle, the calculation apparatus 810 calculates, based on the 3-dimensional spatial information received from the detection apparatus, a plurality of 3-dimensional flow vectors representing moving distances and moving directions, in the 3-dimensional space, of feature points of an object. The calculation apparatus 810 performs a perspective projection transformation on the 3-dimensional flow vector in the image of the view seen ahead and calculates a 2-dimensional flow vector in the image space 411 under the assumption that the eye of the driver is located at the reference location. The calculation apparatus 810 outputs the calculated 2-dimensional flow vector to the input device 121 of the display control apparatus 120. The input device 121 outputs the received 2-dimensional flow vector to the controller 122.

A known method may be employed in the process of performing the perspective projection transformation on 3-dimensional coordinates of a feature point of an object and calculating 2-dimensional coordinates in a 2-dimensional plane, and thus a further detailed description thereof is omitted.

In a case where it is determined that it is necessary for the driver to gaze ahead of the vehicle, the controller 122 controls the image generation apparatus 130 based on the 2-dimensional flow vector and the image information so as to generate a processed image. More specifically, the magnitude and the direction of each 2-dimensional flow vector respectively represent the moving distance and the moving direction of a pixel located at coordinates of the starting point of the 2-dimensional flow vector. Furthermore, the controller 122 calculates moving distances and moving directions of pixels at other coordinates by performing linear interpolation on the moving distance and the moving direction at the coordinates of the starting point of the 2-dimensional flow vector. The controller 122 then controls the image generation apparatus 130 so as to generate a processed image by moving pixels of the base image 200 according to the moving distances and the moving directions calculated for the respective pixels. Under the control described above, the image generation apparatus 130 generates image data representing the processed image and outputs the resultant image data to the display medium 140. Thus, the processed image is displayed on the display medium 140.

Note that the flow the operation of the display control apparatus 120 according to the present embodiment is similar to that shown in FIG. 15 except that in step S1001 and step S1002, the flow vector is replaced by the 2-dimensional flow vector.

In the display system 1100 according to the third embodiment, as described above, the base image is deformed based on the 3-dimensional coordinates of feature points of an object calculated by the detection apparatus from an image of the view seen ahead. As a result, the image superimposed on the view seen ahead is deformed such that the amount of change and the change in direction are the same as those of the view seen ahead. For example, in a case where there is another vehicle running in a lateral direction in front of the present vehicle, an image part superimposed on this vehicle is deformed in a direction in which the vehicle moves. Therefore, when the driver is watching ahead of a vehicle, if a change occurs in the above-described manner in the image displayed on the display medium 140, this change is not very perceivable by the driver, which prevents the attention of the driver from being paid to the display medium 140.

Although in the present embodiment, it is assumed by way of example that the controller 122 employs linear interpolation to calculate moving distances and moving directions of respective pixels from the moving distance and the moving direction at the coordinates of the starting point of the 2-dimensional flow vector acquired from the calculation apparatus 810. Alternatively, other methods such as spline interpolation, Lagrange interpolation, or the like may be employed as long as it is possible to calculate 2-dimensional flow vectors of pixels.

Although in the present embodiment, it is assumed by way of example that the controller 122 calculates moving distances and moving directions of respective pixels by performing interpolation on the moving distance and the moving direction at the coordinates of the starting point of the 2-dimensional flow vector, but an alternative method may be employed. For example, a moving distance and a moving direction at coordinates of a starting point of a 2-dimensional flow vector located closest to each pixel may be directly employed as the moving distance and the moving direction for the pixel.

Fourth Embodiment

Figure 17:
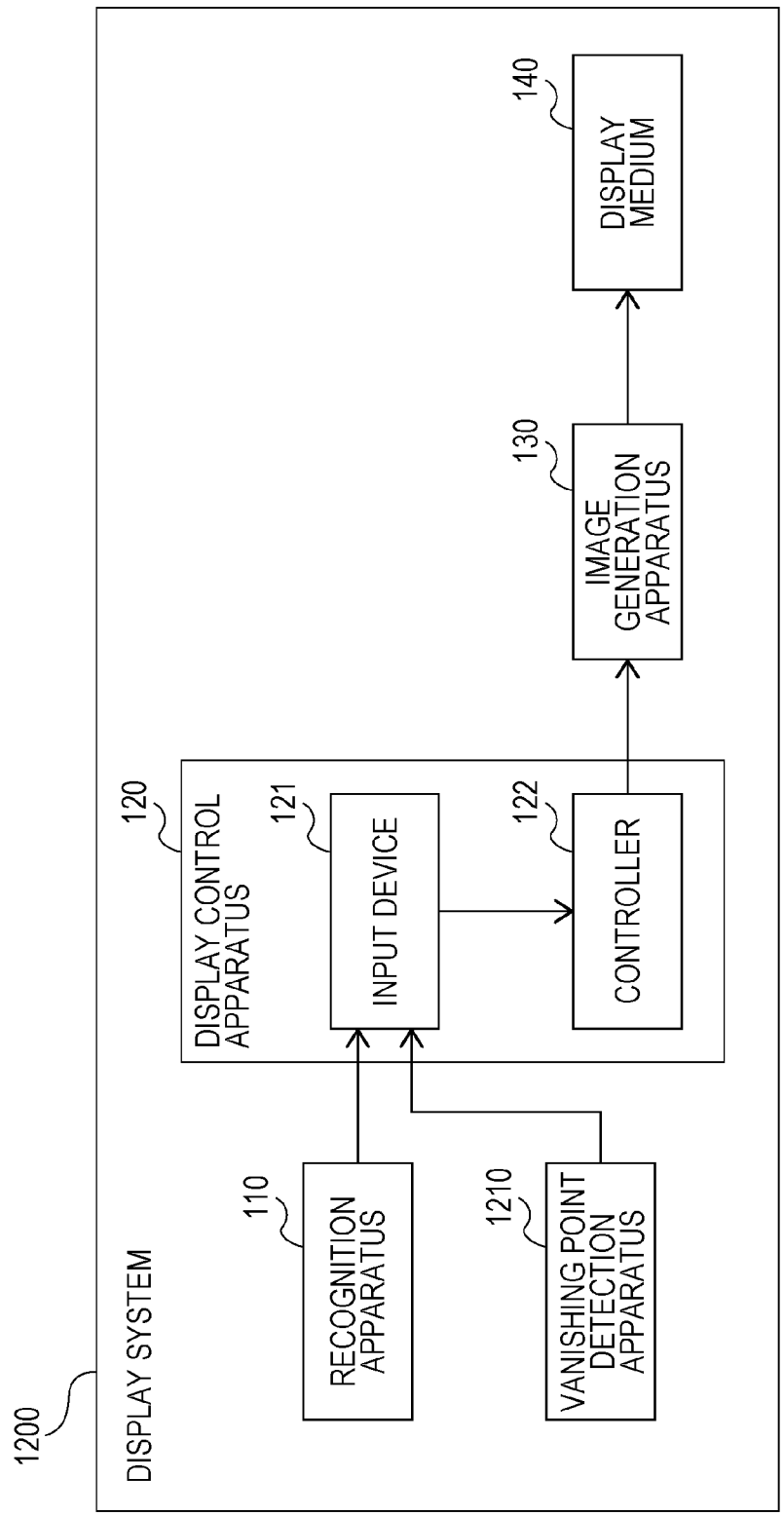
FIG. 17 is a block diagram illustrating an example of a configuration of a display system including a display control apparatus according to a fourth embodiment of the present disclosure.

FIG. 17 is a block diagram illustrating an example of a configuration of a display system 1200 according to a fourth embodiment of the present disclosure. The display system 1200 shown in FIG. 17 is different from the display system 100 shown in FIG. 1 in that a vanishing point detection apparatus 1210 is additionally provided.

The detection apparatus (for example, a sensing camera (not illustrated)) takes time-sequential images of a view seen in a backward or lateral direction from the driver (hereinafter referred to simply as a "rear view"), and the detection apparatus outputs a plurality of rear view images to the vanishing point detection apparatus 1210. The detection apparatus, which outputs the rear view image to the vanishing point detection apparatus 1210, may be the same as or may be different from the detection apparatus that outputs the image of the view seen ahead to the recognition apparatus 110.

The vanishing point detection apparatus 1210 extracts a plurality of flow vectors indicating moving distances and moving directions of an object by an optical flow based on the plurality of rear view image received from the detection apparatus. The vanishing point detection apparatus 1210 calculates the movement vanishing point of the rear view from the extracted flow vector. The vanishing point detection apparatus 1210 outputs, to the input device 121, information associated with the rear view image received from the detection apparatus and information associated with the calculated movement vanishing point of the rear view.

A known method may be employed in the process of calculating a flow vector based on an optical flow from a plurality of images and calculating a movement vanishing point of an image from the flow vector, and thus a further detailed description thereof is omitted.

The input device 121 receives the information associated with the rear view image and the information associated with the movement vanishing point in the rear view from the vanishing point detection apparatus 1210, and the input device 121 outputs the received information to the controller 122.

The controller 122 receives, from the input device 121, the information associated with the rear view image, the information associated with the movement vanishing point in the rear view and image information (for example, information used in generating image data representing the base image 200).

The controller 122 performs processing in different manners depending on whether the controller 122 determines that it is necessary for a driver to gaze ahead of a vehicle or that it is not necessary for the driver to gaze ahead of the vehicle.

In a case where it is determined that it is not necessary for the driver to gaze ahead of the vehicle, the controller 122 controls the image generation apparatus 130 based on the image information and the rear view image information so as to generate a superimposed image in which the rear view image is superimposed on the base image. According to the control described above, the image generation apparatus 130 generates image data representing the superimposed image in which the rear view image is superimposed on the base image, and outputs the resultant image data to the display medium 140. As a result, a vehicle occupant of the vehicle can view the superimposed image.

Figure 18:
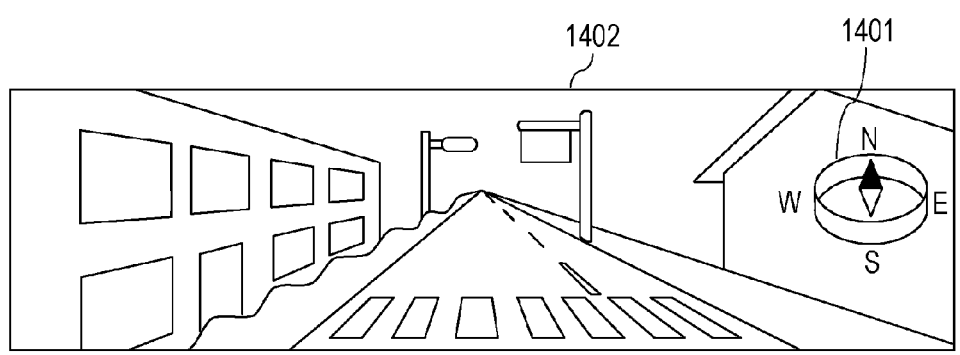
FIG. 18 is a diagram illustrating an example of a superimposed image according to the fourth embodiment of the present disclosure.

FIG. 18 is a diagram illustrating an example of a superimposed image. In this example illustrated in FIG. 18, an image 1401 of a compass (which is an example of an element image included in a base image) is superimposed on a rear view image 1402.

On the other hand, in a case where it is determined that it is necessary for the driver to gaze ahead of the vehicle, the controller 122 controls the image generation apparatus 130 based on the image formation, the rear view image information, and the information on the movement vanishing point in the rear view so as to generate a superimposed image in which a processed image is superimposed on the rear view image. In this case, the image information is that received by the controller 122 from the input device 121 at the time when the above-described determination is made. More specifically, for example, the controller 122 controls the image generation apparatus 130 so as to generate image data representing a processed image that is deformed in a particular manner from the base image depending on passing time and so as to further generate a superimposed image by superimposing the generated processed image on the rear view image over a period with a predetermined length of time after the time at which it is determined that it is necessary for the driver to gaze ahead of the vehicle. According to the control described above, the image generation apparatus 130 generates image data representing the superimposed image in which the processed image is superimposed on the rear view image, and outputs the resultant image data to the display medium 140. As a result, a vehicle occupant of the vehicle can view the superimposed image.

In the above-described process, the deformation in the particular manner is a deformation process in each part of the base image is deformed and moved such that the parts of the base image converge toward the vanishing point of the in the rear view.

Referring to FIGS. 19A to 19D, a description is given below as to an example of sequence of changes in a superimposed image in which a processed image is superimposed on a rear view image. That is, FIGS. 19A to 19D are diagrams illustrating the example of sequence of changes of in the superimposed image.

Figure 19A:
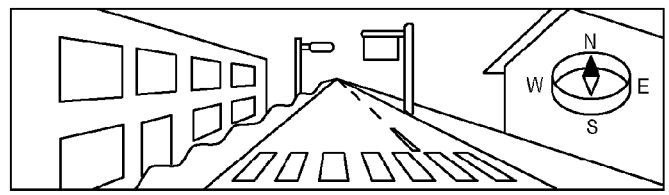
FIGS. 19A to 19D are diagrams illustrating an example of a sequence of changes in an image according to the fourth embodiment of the present disclosure.
Figure 19B:
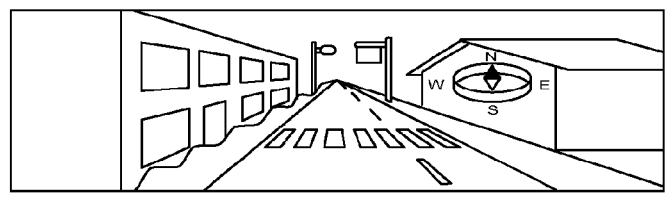
Figure 19C:
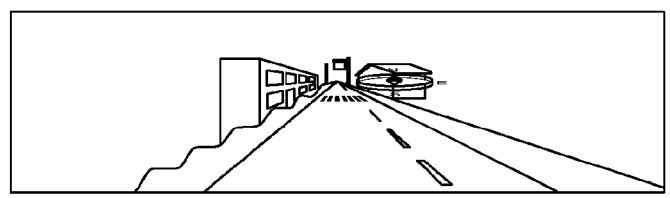
Figure 19D:
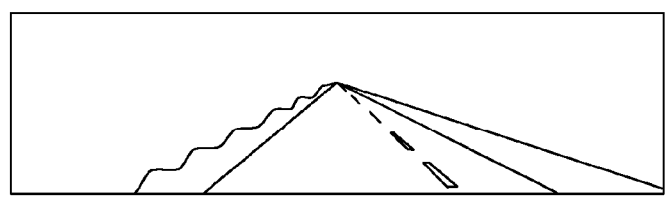

When the superimposed image shown in FIG. 19A (which is the same as the superimposed image shown in FIG. 18, that is, the image including the rear view image and the original undeformed image of the compass superimposed on the rear view image) is displayed on the display medium 140, if it is determined that it is necessary for a driver to gaze ahead of a vehicle, then the image displayed on the display medium 140 is changed as time passes as follows: first, a superimposed image illustrated in FIG. 19B (an image including the rear view image and a deformed image of the compass superimposed on the rear view image) is displayed; next, a superimposed image illustrated in FIG. 19C (an image including the rear view image and a further deformed image of the compass superimposed on the rear view image) is displayed; and finally, the image of the compass disappears from the rear view image as illustrated in FIG. 19D.

As shown in FIGS. 19A to 19D, in a case where it is determined that it is necessary for the driver to gaze ahead of the vehicle, the image of the compass is changed with time such that parts of the image of the compass converge toward the movement vanishing point of the rear view, and finally the parts of the image of the compass sequentially disappear.

The flow of the operation associated with the display control apparatus 120 is described below with reference to FIG. 20. FIG. 20 is a flow chart illustrating an example of an operation flow associated with a display control apparatus 120 according to the fourth embodiment of the present disclosure. In FIG. 20, similar elements to those in FIG. 7 are denoted by similar reference symbols or numerals to those in FIG. 7, and a further duplicated description thereof is omitted.

The controller 122 receives information associated with the rear view image from the vanishing point detection apparatus 1210 via the input device 121 (step S1501). Furthermore, the controller 122 receives the information associated with the movement vanishing point in the rear view from the vanishing point detection apparatus 1210 via the input device 121.

In a case where it is determined that it is not necessary for the driver to gaze ahead of the vehicle, (No in step S752), the controller 122 controls the image generation apparatus 130 based on the rear view image information and the image information so as to generate a superimposed image in which the rear view image is superimposed on the base image (see for example, FIG. 18 and FIG. 19A) (step S1502). According to the control described above, the image generation apparatus 130 generates image data representing the superimposed image including the base image and the rear view image superimposed on the base image, and outputs the resultant image data to the display medium 140. As a result, a vehicle occupant of the vehicle can view the superimposed image.

On the other hand, in a case where it is determined that it is necessary for the driver to gaze ahead of the vehicle, (Yes in step S752), then the controller 122 controls the image generation apparatus 130 based on the information associated with the rear view image, the information associated with the movement vanishing point in the rear view, and the image information so as to generate a superimposed image in which the processed image is superimposed on the rear view image (see, for example, FIG. 19B, FIG. 19C, and FIG. 19D) (step S1503). According to the control described above, the image generation apparatus 130 generates the image data representing the superimposed image in which the processed image is superimposed on the rear view image, and outputs the resultant image data to the display medium 140. As a result, a vehicle occupant of the vehicle can view the superimposed image.

In the display system 1200 according to the fourth embodiment, as described above, in a case where it is necessary for the driver to gaze ahead of the vehicle, parts of the base image superimposed on the rear view image displayed on the display medium 140 are deformed such that the parts of the base image are moved toward the movement vanishing point in the rear view at which the movement of the rear view image converges and such that finally the parts of the base image disappear at the movement vanishing point. This manner of deforming the superimposed image well fits with the change in the flow of the rear view image. Therefore, when the driver is looking at the superimposed image via a peripheral vision while watching ahead of the vehicle, if a change occurs in the image displayed on the display medium 140 in the above-described manner in which the change fits with the flow of the rear view image, the change is not very perceivable by the driver, which prevents the attention of the driver from being paid to the display medium 140. On the other hand, when the attention of the driver is being paid to the image displayed on the display medium 140, if a change occurs in the base image superimposed on the rear view image displayed on the display medium 140, this change is perceived by the driver, which prompts the driver to pay attention back to watching ahead of the vehicle. That is, because the image is changed in the above-described manner such that a sudden change such as a sudden disappearance does not occur so as not to bother the driver, it is possible to prevent the attention of the driver from being unnecessarily paid to the display, which contributes to enhancement of safety in driving.

In the present embodiment, the rear view image including an image seen in a backward or backward lateral direction from the driver is used as a part of the superimposed image by way of example but not limitation. Alternatively, instead of the rear view image, for example, an image of a view seen in a forward or lateral direction from the driver may be employed.

In the present embodiment, it is assumed by way of example that the movement vanishing point in the rear vies is employed as the reference point in deforming the base image, but the reference point is not limited to this. An arbitrary point (for example, a point in the image space including the original undeformed presentation image, a point on the display medium, or other points) may be employed as long as it is possible to achieve similar effects to those achieved in the embodiment.

Fifth Embodiment

Figure 21:
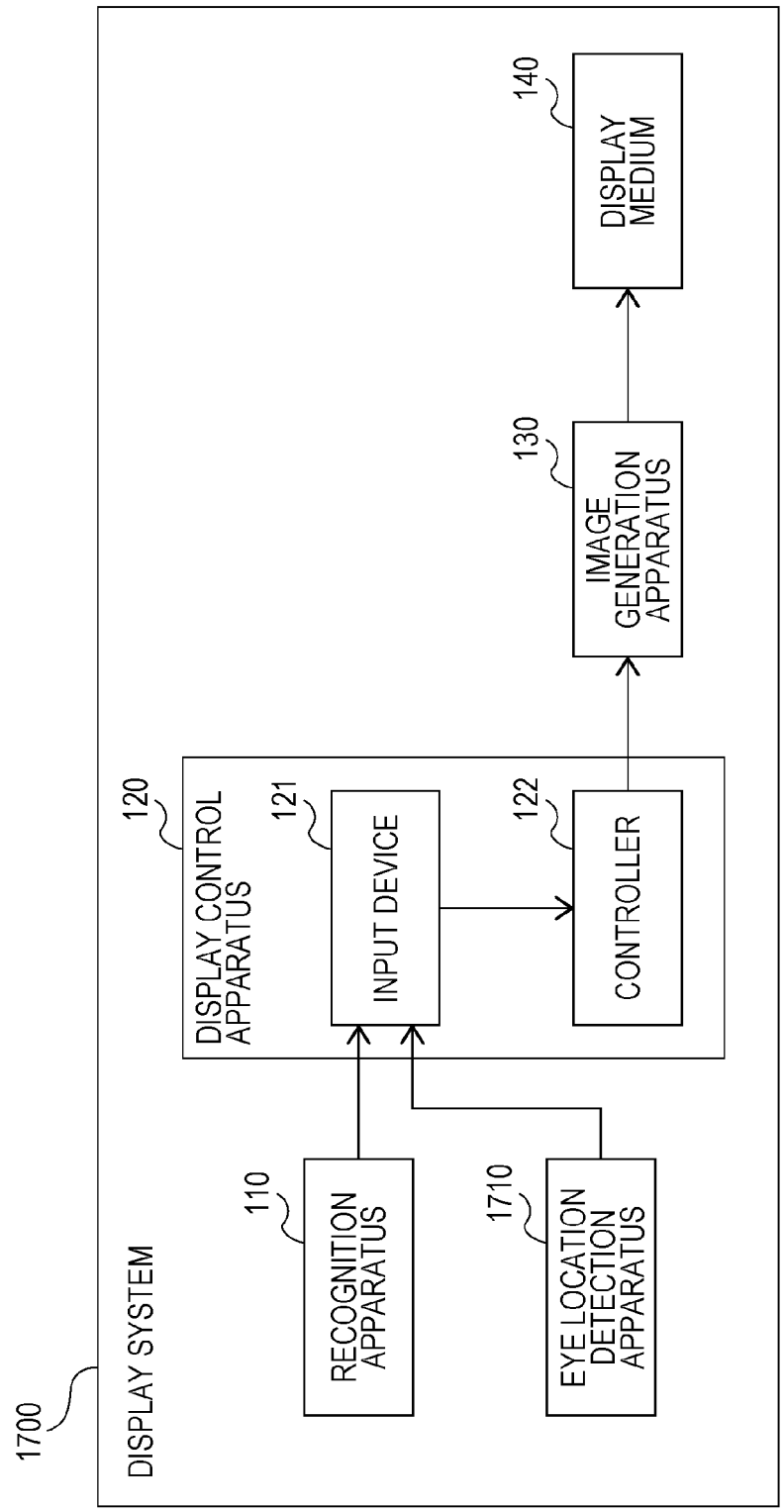
FIG. 21 is a block diagram illustrating an example of a configuration of a display system including a display control apparatus according to a fifth embodiment of the present disclosure.

FIG. 21 is a block diagram illustrating an example of a configuration of a display system 1700 according to a fifth embodiment of the present disclosure. The display system 1700 shown in FIG. 21 is different from the display system 100 shown in FIG. 1 in that an eye location detection apparatus 1710 is additionally provided. In the present embodiment, in addition to the detection apparatus (for example, a sensing camera) that outputs an image of the view seen ahead to the recognition apparatus 110, there is provided another detection apparatus (for example, an inner camera or a driver monitoring camera) that is disposed in a vehicle room to take an image of a face of a driver. Hereinafter, the latter detection apparatus is referred to as an "inner camera".

The inner camera takes an image of a face of the driver and outputs the resultant image (hereinafter referred to as a "face image") to the eye location detection apparatus 1710.

The eye location detection apparatus 1710 detects an eye area of the driver (hereinafter referred to simply as an "eye area") based on the face image received from the inner camera. The eye area is, for example, a particular area including both eyes. The eye location detection apparatus 1710 calculates the location of a particular point (for example, one or two eyes or a center point between the two eyes) in the detected eye area, and the eye location detection apparatus 1710 outputs eye location information indicating the calculated location of the particular point to the input device 121 of the display control apparatus 120.

The input device 121 receives the eye location information from the eye location detection apparatus 1710 and outputs the received eye location information to the controller 122.

The controller 122 controls the process such that the center point, functioning as the reference in deforming the image, is changed depending on the location of the eye indicated by the eye location information. More specifically, the controller 122 sets the particular point indicated by the eye location information as the reference location used in calculating the movement vanishing point in the view seen ahead, and calculates the movement vanishing point in the view seen ahead based on this reference location. Thereafter, in a similar manner to the first embodiment described above, the controller 122 controls the image generation apparatus 130 based on the calculated movement vanishing point in the view seen ahead and the image information so as to generate image data representing the processed image.

In the fifth embodiment, as described above, the location of the center point is changed depending on the location of the eye of the driver. Thus the movement vanishing point in the view seen ahead by the driver always varies depending on the location of the eye of the driver, and this ensures that it is possible to deform the image such that the center of the deformation is always located at the point at which the movement of the view seen ahead starts as viewed from the eye of the driver. Thus when the attention of the driver is paid to watching ahead of the vehicle, if a change occurs in the above-described manner in the image displayed on the display medium 140, this change is not very perceivable by the driver.

Sixth Embodiment

Figure 22:
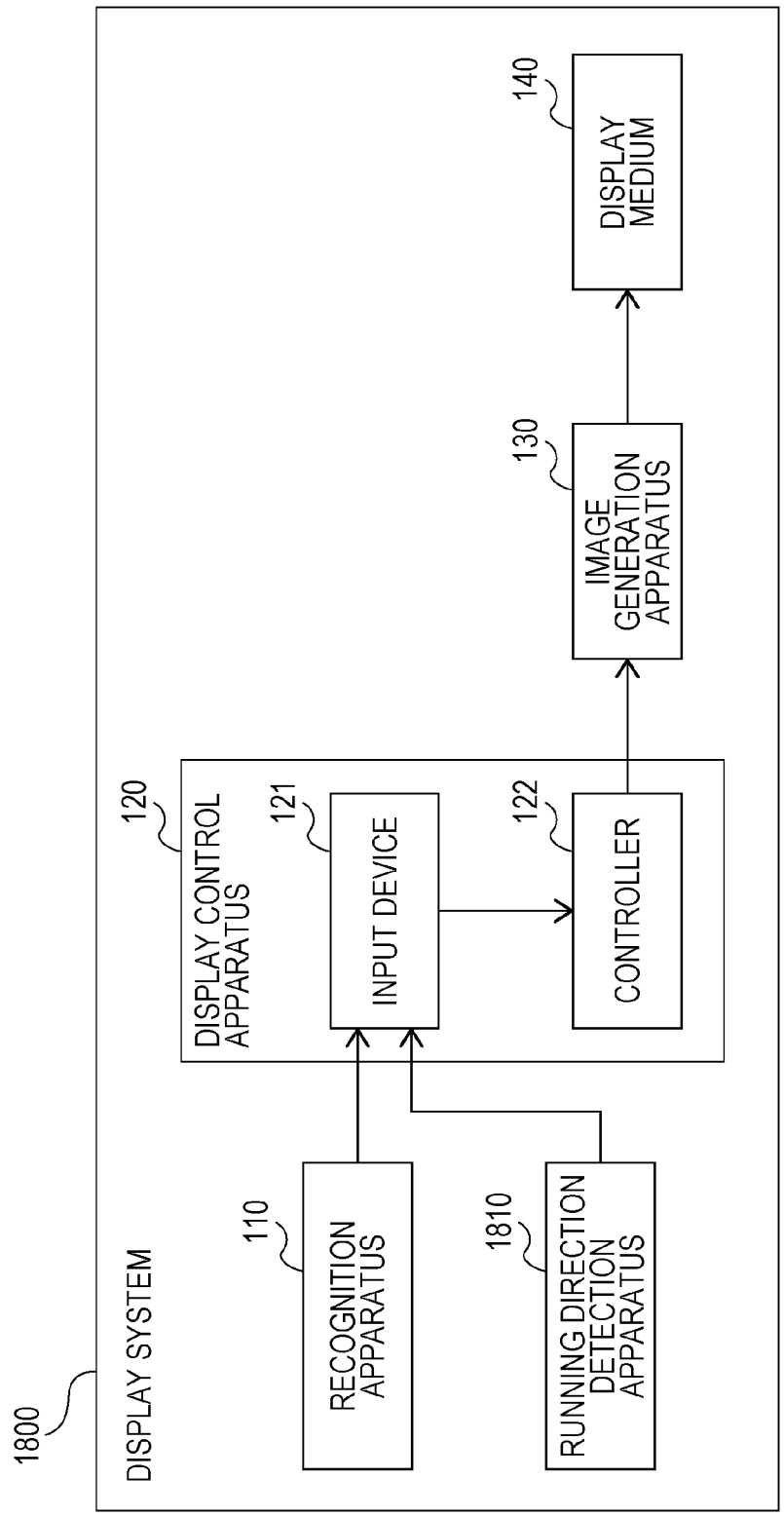
FIG. 22 is a block diagram illustrating an example of a configuration of a display system including a display control apparatus according to a sixth embodiment of the present disclosure.

FIG. 22 is a block diagram illustrating an example of a configuration of a display system 1800 according to a sixth embodiment. The display system 1800 shown in FIG. 22 is different from the display system 100 shown in FIG. 1 in that a running direction detection apparatus 1810 is additionally provided.

First, the running direction detection apparatus 1810 calculates a vehicle running direction based on a plurality of images of the view seen ahead received from a detection apparatus (for example, a sensing camera (not shown)). More specifically, based on a plurality of images of the view seen ahead captured time-sequentially, the running direction detection apparatus 1810 calculates the movement vanishing point in the view seen ahead in the image of the view seen ahead by the optical flow. Note that the detection apparatus, which outputs the image of the view seen ahead to the running direction detection apparatus 1810, may be the same as or may be different from the detection apparatus that outputs the image of the view seen ahead to the recognition apparatus 110.

Next, based on the calculated movement vanishing point in the view seen ahead and the angle of view of the detection apparatus, the running direction detection apparatus 1810 calculates the direction in which the movement vanishing point in the view seen ahead is located with the respect to the detection apparatus.

Next, based on the calculated direction in which the movement vanishing point in the view seen ahead is located and the installation angle of the detection apparatus, the running direction detection apparatus 1810 calculates a direction in which the movement vanishing point in the view seen ahead is located in the field of view of the driver.

The running direction detection apparatus 1810 then determines the vehicle running direction so as to be the same as the calculated direction in which the movement vanishing point in the view seen ahead is located in the field of view of the driver, and the running direction detection apparatus 1810 outputs vehicle running direction information indicating the determined running direction of the vehicle to the input device 121 of the display control apparatus 120.

A process of calculating a movement vanishing point by an optical flow is known, and thus a description thereof is omitted. A method is also known as to a process of calculating a direction in which a movement vanishing point is located with respect to a camera based on an angle of view of the camera in a camera image, and thus a description thereof is omitted. A method is also known as to a process of calculating a direction in which a movement vanishing point is located in a field of view of a driver based on the direction in which the movement vanishing point is located with respect to the camera and an installation angle of the camera, and thus a description thereof is omitted.

The input device 121 receives the vehicle running direction information from the running direction detection apparatus 1810 and outputs the received vehicle running direction information to the controller 122.

Based on the direction indicated by the vehicle running direction information, that is, the direction in which the movement vanishing point is located in the field of view of the driver, the controller 122 calculates the location of the movement vanishing point in an image space 411 (see FIG. 4). The controller 122 then controls the image generation apparatus 130 based on the calculated movement vanishing point in the view seen ahead and the image information so as to generate image data representing the processed image in a similar manner to the first embodiment described above.

In the sixth embodiment, as described above, the location of the center point is changed depending on the running direction of the vehicle. This ensures that it is possible to deform the image such that the center of the deformation is always at the starting point at which the movement of the view seen ahead diverges. Thus when a driver is watching ahead of a vehicle, if a change occurs in the above-described manner in the image displayed on the display medium 140, this change is not very perceivable by the driver.

In the present embodiment, it is assumed by way of example but not limitation that the running direction of a vehicle is calculated using an image captured by a sensing camera. Alternatively, for example, the running direction of the vehicle may be calculated from a steering angle or the running direction of the vehicle may be calculated using global positioning system (GPS) information.

Seventh Embodiment

Figure 23:
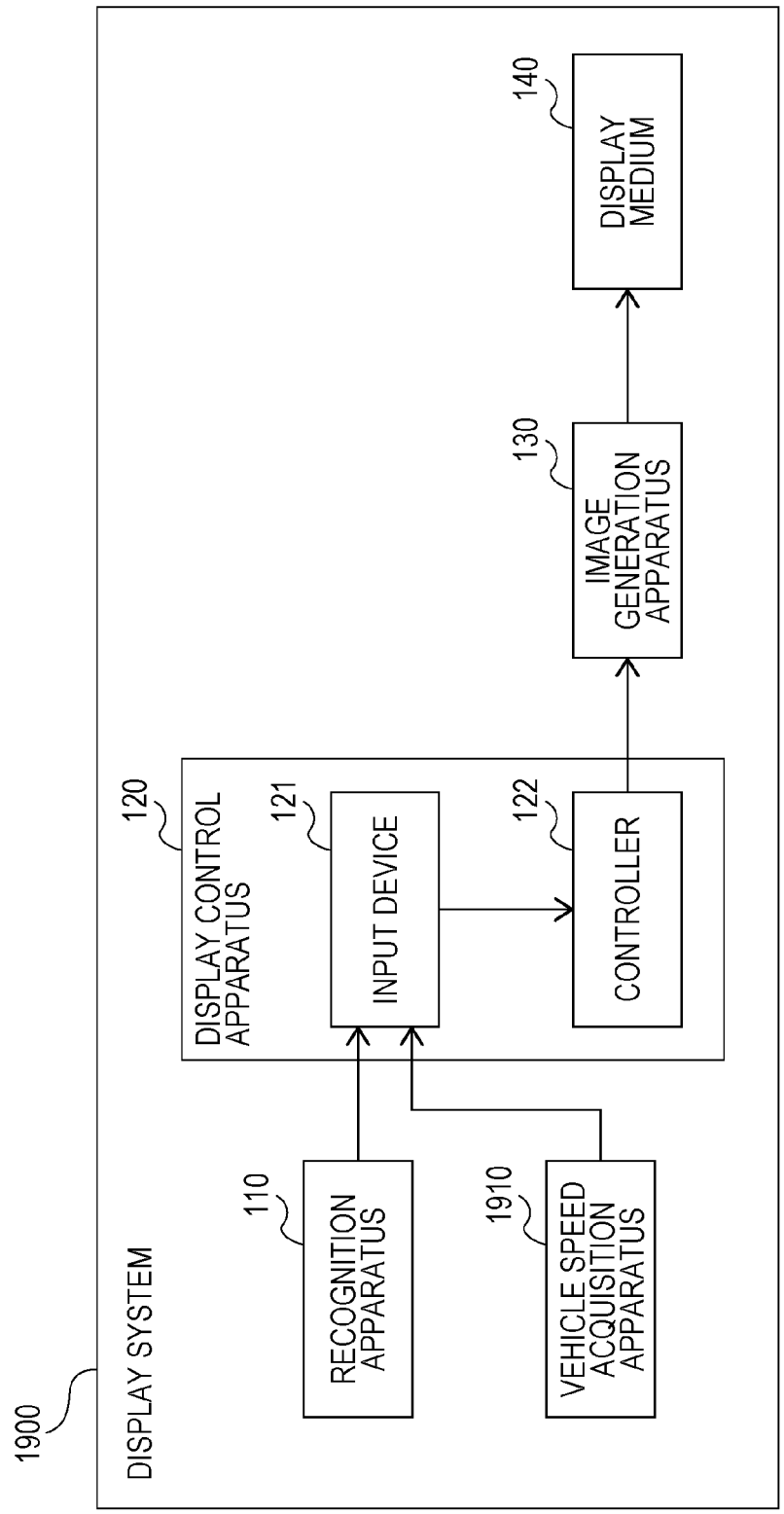
FIG. 23 is a block diagram illustrating an example of a configuration of a display system including a display control apparatus according to a seventh embodiment of the present disclosure.

FIG. 23 is a block diagram illustrating an example of a configuration of a display system 1900 according to a seventh embodiment of the present disclosure. The display system 1900 shown in FIG. 23 is different from the display system 100 shown in FIG. 1 in that a vehicle speed acquisition apparatus 1910 is additionally provided.

The vehicle speed acquisition apparatus 1910 acquires vehicle speed information indicating a vehicle speed calculated by a particular apparatus (for example, a vehicle speed generation apparatus (not shown)) from a rotation speed per unit time of a wheel of a vehicle. The vehicle speed acquisition apparatus 1910 outputs the acquired vehicle speed information to the input device 121 of the display control apparatus 120.

The input device 121 receives the vehicle speed information from the vehicle speed acquisition apparatus 1910 and outputs the received vehicle speed information to the controller 122.

Using the vehicle speed information, the controller 122 calculates a value of a particular distance L shown in FIG. 4. The particular distance L is calculated, for example, using a value proportional to the vehicle speed. Furthermore, as in the first embodiment descried above, the controller 122 controls the image generation apparatus 130 based on the calculated particular distance L and the image information so as to generate image data representing the processed image.

An example of a sequence of changes in a presentation image according to the present embodiment is described below with reference to FIGS. 24A to 24D. FIGS. 24A to 24D are diagrams illustrating an example of a sequence of changes in the presentation image.

Figure 24A:
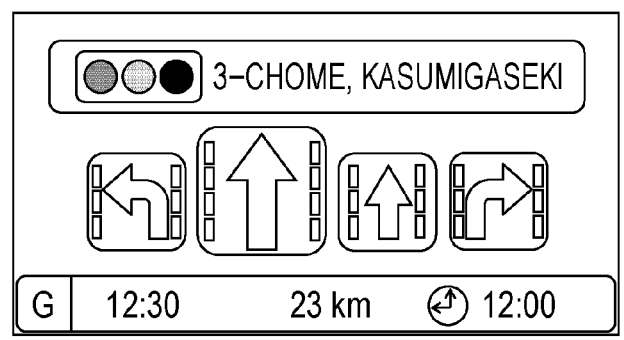
FIGS. 24A to 24D are diagrams illustrating an example of a sequence of changes in a presentation image according to the seventh embodiment of the present disclosure.
Figure 24B:
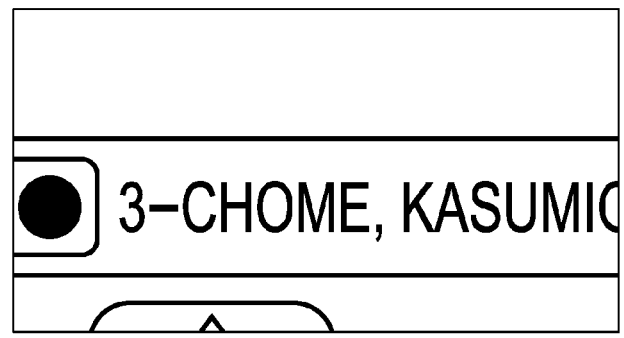
Figure 24C:
Figure 24D:
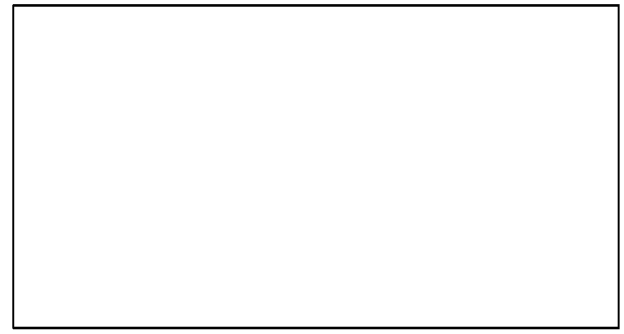

When a base image shown in FIG. 24A (which is the same as the base image 200 shown in FIG. 2) is displayed on the display medium 140, if it is determined that it is necessary for a driver to gaze ahead of a vehicle, then the image displayed on the display medium 140 is changed with time as follows: a processed image shown in FIG. 24B is first displayed; then a processed image shown in FIG. 24C is displayed; and finally, a processed image shown in FIG. 24D is displayed.

As shown in FIGS. 24A to 24D, in a case where it is determined that it is necessary for the driver to gaze ahead of the vehicle, the base image 200 is changed with time such that the element images of the base image 200 are deformed (so as to diverge) in radial directions from the center given by the movement vanishing point in the view seen ahead and the deformed element images move toward one side of the display medium 140 (a bottom side in the example shown in FIGS. 24A to 24), and finally the deformed element images disappear to the outside of the display medium 140 across edges thereof.

In the seventh embodiment, as described above, the speed of deforming the image is changed according to the change in the movement speed of the vehicle. That is, the view seen ahead and the image on the display medium change in a corresponding manner. Thus when a driver is watching ahead of a vehicle if a change occurs in the above-described manner in the image displayed on the display medium 140, this change is not very perceivable by the driver.

Although in the present embodiment, the vehicle speed acquisition apparatus 1910 calculates the vehicle speed from the rotation speed of the wheel per unit time, the calculation method is not limited to this. Alternatively, for example, the vehicle speed may be calculated from a moving distance per unit time acquired from the GPS, or may be calculated from an amount of change in an image captured by a camera installed on a vehicle.

The present disclosure has been described above with reference embodiments.

Figure 25:
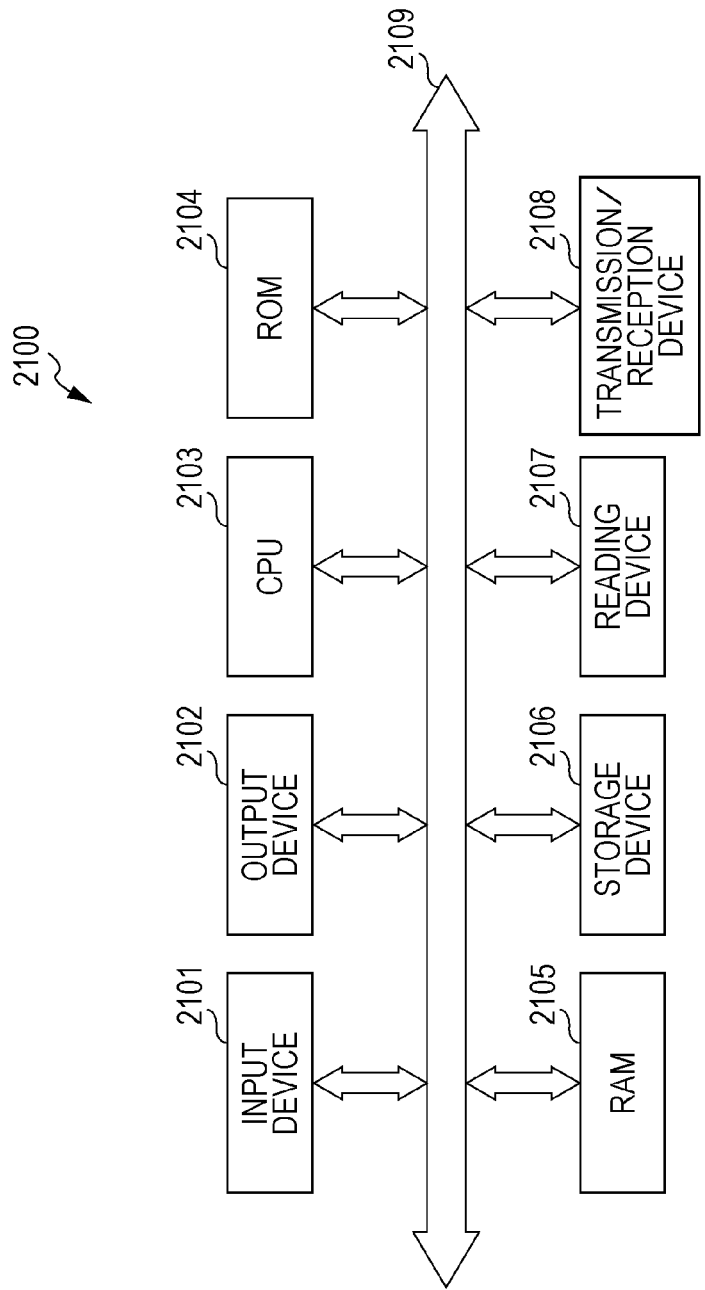
FIG. 25 is a diagram illustrating a hardware configuration of a computer that realizes various functions by a program.

FIG. 25 is a diagram illustrating a hardware configuration of a computer that realizes, by a program, one or more of the functions according to the respective embodiments described above. This computer 2100 includes an input apparatus 2101 such as a keyboard, a touch pad, or the like, an output apparatus 2102 such as a display, a speaker, or the like, a central processing unit (CPU) 2103, a read only memory (ROM) 2104, and a random access memory (RAM) 2105. The computer 2100 further includes a storage apparatus 2106 such as a hard disk apparatus, a solid state drive (SSD) or the like, a reading apparatus 2107 that reads out information from a storage medium such as a digital versatile disk read only memory (DVD-ROM), an universal serial bus (USB) memory, or the like, and a transmission/reception apparatus 2108 that performs communication via a network. Each unit described above is connected to each other via a bus 2109.

The reading apparatus 2107 reads the program from the storage medium in which the program for realizing the functions is stored, and the reading apparatus 2107 stores the program in the storage apparatus 2106. Alternatively, the transmission/reception apparatus 2108 may download the program for realizing the functions from a server apparatus by communicating with the server apparatus via a network and may store the downloaded program in the storage apparatus 2106.

The CPU 2103 copies the program stored in the storage apparatus 2106 into the RAM 2105, and sequentially reads out instructions included in the program from the RAM 2105 and executes them thereby realizing the functions described above. When the program is executed, information obtained in one or more of the processes described in the respective embodiments may be stored in the RAM 2105 or the storage apparatus 2106 and may be used as required.

In the display control apparatus, the projection apparatus, the display control method, and the storage medium according to the present disclosure, the displayed image is controlled so as not to have an abrupt change such as sudden disappearance, which contributes to enhancement of safety in driving.

What is claimed is:

1. A display control apparatus, comprising:
   a receiver that receives a recognition of a change in environment around a vehicle; and
   a controller that generates a control signal and outputs the control signal to an image generation apparatus such that the image generation apparatus generates image data corresponding to presentation images to be displayed on a display medium, based on the control signal,
   wherein the controller further controls the image generation apparatus via the control signal
       so as to deform the presentation images radially on the display medium about a particular point, then move the presentation images toward at least one of sides of the display medium, and cause the presentation images to disappear sequentially to an outside of the display medium across an edge of the display medium, or
       so as to deform the presentation images and cause the presentation images to converge toward the particular point,
       based on a received recognition result,
   wherein the particular point is a starting point of divergence or an ending point of convergence of a movement of a scene outside the vehicle that occurs caused by running of the vehicle, and
   wherein the controller calculates a movement vanishing point based on a position of an eye of a driver of the vehicle or a direction in which the vehicle moves.

2. The display control apparatus according to claim 1, wherein the receiver receives image information stored in a device from the device used in the vehicle, and
   the controller outputs the control signal to the image generation apparatus, so as to cause the image generation apparatus to generate the image data, based on the received image information.

3. The display control apparatus according to claim 1, wherein the recognition of the change in the environment around the vehicle includes recognition of a particular object that appears ahead of the vehicle.

4. The display control apparatus according to claim 1, wherein the controller outputs, to the image generation apparatus, the control signal to control each part of an original undeformed presentation image so as to move by a distance corresponding to a movement of a scene outside the vehicle in an image space including the original undeformed presentation image.

5. The display control apparatus according to claim 1, wherein the controller outputs, to the image generation apparatus, the control signal to control each part of an original undeformed presentation image so as to move by a distance corresponding to a speed of the vehicle.

6. The display control apparatus according to claim 1, wherein the controller outputs, to the image generation apparatus, the control signal to control each part of an original undeformed presentation image so as to move by a distance corresponding to a distance in an image space from a particular point.

7. The display control apparatus according to claim 1, wherein the controller outputs, to the image generation apparatus, the control signal to superimpose the deformed presentation images on a captured image of the outside of the vehicle and display a resultant superimposed image on the display medium.

8. A projection apparatus, comprising:
   an image generator that generates image data and outputs a resultant image data to a display medium;
   a receiver that receives a recognition result of a change in environment around a vehicle; and
   a controller that controls the image generator to generate the image data so as to correspond to presentation images to be displayed on the display medium such that the image generator generates image data corresponding to presentation images to be displayed on the display medium, based on a control signal,
   wherein the controller further controls the image generator via the control signal
       so as to deform the presentation images radially on the display medium about a particular point, then move the presentation images toward at least one of sides of the display medium, and cause the presentation images to disappear sequentially to an outside of the display medium across an edge of the display medium, or
       so as to deform the presentation images and cause the presentation images to converge toward the particular point,
       based on a received recognition result,
   wherein the particular point is a starting point of divergence or an ending point of convergence of a movement of a scene outside the vehicle that occurs caused by running of the vehicle, and
   wherein the controller calculates a movement vanishing point based on a position of an eye of a driver of the vehicle or a direction in which the vehicle moves.

9. A display control method, comprising:
   receiving a recognition result of a change in environment around a vehicle;
   generating a control signal; and
   outputting the control signal to an image generation apparatus such that the image generation apparatus generates image data corresponding to presentation images to be displayed on a display medium, based on the control signal,
   wherein a controller further controls the image generation apparatus via the control signal
       so as to deform the presentation images radially on the display medium about a particular point, then move the presentation images toward at least one of sides of the display medium, and cause the presentation images to disappear sequentially to the outside of the display medium across an edge of the display medium, or
       so as to deform the presentation images and cause the presentation images to converge toward the particular point,
       based on the received recognition result,
   wherein the particular point is a starting point of divergence or an ending point of convergence of a movement of a scene outside the vehicle that occurs caused by running of the vehicle, and wherein the controller calculates a movement vanishing point based on a position of an eye of a driver of the vehicle or a direction in which the vehicle moves.

10. A non-transitory computer-readable recording medium storing a display control program that controls a computer to execute a process comprising:

receiving a recognition result from a recognition apparatus that recognizes a change in environment around a vehicle;

generating a control signal; and outputting the control signal to an image generation apparatus such that the image generation apparatus generates image data corresponding to presentation images to be displayed on a display medium, based on the control signal, wherein a controller further controls the image generation apparatus via the control signal so as to deform the presentation images radially on the display medium about a particular point, then move the presentation images toward at least one of sides of the display medium, and cause the presentation images to disappear sequentially to the outside of the display medium across an edge of the display medium, or so as to deform the presentation images and cause the presentation images to converge toward the particular point, based on the received recognition result, wherein the particular point is a starting point of divergence or an ending point of convergence of a movement of a scene outside the vehicle that occurs caused by running of the vehicle, and wherein the controller calculates a movement vanishing point based on a position of an eye of a driver of the vehicle or a direction in which the vehicle moves.

* * * * *